United States Patent
Yu et al.

(10) Patent No.: US 12,391,853 B2
(45) Date of Patent: Aug. 19, 2025

(54) ADHESIVE FORMULATIONS FOR ROOFING APPLICATIONS AND RELATED METHODS

(71) Applicant: BMIC LLC, Dallas, TX (US)

(72) Inventors: Lingtao Yu, Summit, NJ (US); Linlin Xing, Wayne, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/331,815

(22) Filed: Jun. 8, 2023

(65) Prior Publication Data

US 2023/0313005 A1    Oct. 5, 2023

Related U.S. Application Data

(63) Continuation of application No. 17/955,388, filed on Sep. 28, 2022, now Pat. No. 11,718,773, which is a continuation of application No. 17/518,847, filed on Nov. 4, 2021, now Pat. No. 11,472,988.

(60) Provisional application No. 63/109,716, filed on Nov. 4, 2020.

(51) Int. Cl.
| | |
|---|---|
| C09J 171/02 | (2006.01) |
| C08G 65/336 | (2006.01) |
| C08K 3/013 | (2018.01) |
| C08K 5/00 | (2006.01) |
| E04D 5/10 | (2006.01) |

(52) U.S. Cl.
CPC ......... *C09J 171/02* (2013.01); *C08G 65/336* (2013.01); *C08K 3/013* (2018.01); *C08K 5/0016* (2013.01); *C08K 5/005* (2013.01); *E04D 5/10* (2013.01); *C08K 2201/019* (2013.01); *C09J 2203/346* (2020.08); *C09J 2423/166* (2013.01); *C09J 2427/006* (2013.01)

(58) Field of Classification Search
None
See application file for complete search history.

(56) References Cited

U.S. PATENT DOCUMENTS

| | | | |
|---|---|---|---|
| 4,631,207 A | 12/1986 | Price | |
| 5,203,461 A | 4/1993 | Hanson et al. | |
| 6,305,143 B1 | 10/2001 | Streets et al. | |
| 7,759,425 B2 | 7/2010 | Kawakami et al. | |
| 7,767,308 B2 | 8/2010 | Georgeau et al. | |
| 8,586,688 B2 | 11/2013 | Okamoto et al. | |
| 11,001,734 B2 | 5/2021 | Young et al. | |
| 2003/0145546 A1* | 8/2003 | Georgeau | E04D 5/12 52/746.11 |
| 2007/0088137 A1 | 4/2007 | Georgeau et al. | |
| 2007/0100111 A1 | 5/2007 | Stanjek et al. | |
| 2009/0241450 A1* | 10/2009 | Italiane | E04D 1/265 52/309.3 |
| 2010/0247929 A1 | 9/2010 | Oertli et al. | |
| 2013/0102738 A1 | 4/2013 | Stanjek et al. | |
| 2014/0127448 A1 | 5/2014 | Miller et al. | |
| 2016/0032158 A1 | 2/2016 | Tang et al. | |
| 2016/0312471 A1* | 10/2016 | Hubbard | B32B 27/302 |
| 2016/0362893 A1 | 12/2016 | Tang et al. | |
| 2017/0240688 A1 | 8/2017 | Kramer et al. | |
| 2020/0095478 A1 | 3/2020 | Young et al. | |
| 2020/0095768 A1 | 3/2020 | Yu et al. | |

FOREIGN PATENT DOCUMENTS

| | | |
|---|---|---|
| WO | 2007/050538 A3 | 5/2007 |
| WO | 2020/069132 A2 | 9/2019 |
| WO | 2020/176861 A1 | 9/2020 |
| WO | 2020/188066 A1 | 9/2020 |
| WO | 2022/051492 A1 | 3/2022 |

OTHER PUBLICATIONS

Kaneka MS Polymers website downloaded from www.kanekamspolymer.com/ms-polymers/, Jun. 18, 2025. (Year: 2025).*

* cited by examiner

*Primary Examiner* — Christopher M Rodd
(74) *Attorney, Agent, or Firm* — GREENBERG TRAURIG, LLP

(57) ABSTRACT

Some embodiments of the present disclosure relate to an adhesive formulation comprising a high viscosity silyl modified polymer. In some embodiments, the adhesive formulation may further comprise additional components, such as but not limited to, at least one moisture scavenger, at least one adhesion promoter, at least one catalyst, at least one filler, at least one plasticizer, at least one antioxidant, or any combination thereof. In some embodiments, the adhesive formulation may exclude a low viscosity polymer. In some embodiments, the adhesive formulation may include a low viscosity polymer in no more than a specified amount. At least one method of using the adhesive formulation and at least one roofing system comprising the adhesive formulation are also described herein.

20 Claims, No Drawings

ADHESIVE FORMULATIONS FOR ROOFING APPLICATIONS AND RELATED METHODS

RELATED APPLICATIONS

The present application is a continuation of U.S. patent application Ser. No. 17/955,388, filed Sep. 28, 2022, which is a continuation of U.S. patent application Ser. No. 17/518,847, filed Nov. 4, 2021, now U.S. Pat. No. 11,472,988, which claims benefit of U.S. Provisional Application No. 63/109,716, filed Nov. 4, 2020, the contents of which are incorporated herein by reference in their entirety for all purposes.

FIELD

The present disclosure relates to improved adhesive formulations comprising at least one silyl modified polymer.

BACKGROUND

Adhesive formulations comprising at least one silyl modified polymer are used for a variety of industrial applications, such as but not limited to construction and building applications. Existing adhesive formulations comprising at least one silyl modified polymer, however, continue to pose technical challenges. Improved adhesive formulations that include at least one silyl modified polymer are therefore needed.

SUMMARY

Some embodiments of the present disclosure relate to an adhesive formulation. In some embodiments, the adhesive formulation includes at least one high viscosity silyl modified polymer, at least one moisture scavenger, and at least one low viscosity silyl modified polymer. In some embodiments, the at least one high viscosity silyl modified polymer is present in the adhesive formulation in an amount ranging from 5% to 75% by weight based on a total weight of the adhesive formulation. In some embodiments, a high viscosity silyl modified polymer is a silyl modified polymer having a viscosity of 20,000 cP or higher measured according to ASTM D2196 using a Brookfield viscometer spindle number 6, at 20 rpm and 23° C. In some embodiments, the at least one moisture scavenger is present in the adhesive formulation in a sufficient amount, so as to result in a viscosity of the adhesive formulation of 5,000 cP to 30,000 cP measured according to ASTM D2196 using a Brookfield viscometer spindle number 6, at 20 rpm and at 23° C. In some embodiments, the at least one low viscosity silyl modified polymer is present in a weight ratio of the at least one low viscosity silyl modified polymer to the at least one high viscosity silyl modified polymer of less than 1:4. In some embodiments, a low viscosity silyl modified polymer is a silyl modified polymer with a viscosity of 10,000 cP or lower measured according to ASTM D2196 using a Brookfield viscometer spindle number 6, at 20 rpm and 23° C.

In some embodiments, the at least one high viscosity silyl modified polymer has a viscosity of 20,000 cP to 100,000 cP, measured according to ASTM D2196 using a Brookfield viscometer spindle number 6, at 20 rpm and 23° C.

In some embodiments, the sufficient amount of the at least one moisture scavenger is 0.75% to 10% by weight based on the total weight of the adhesive formulation.

In some embodiments, the sufficient amount of the at least one moisture scavenger is a weight ratio of the at least one moisture scavenger to the at least one high viscosity silyl modified polymer of 1:20 to 1:2.

In some embodiments, the sufficient amount of the at least one moisture scavenger is a molar ratio of the at least one moisture scavenger to the at least one high viscosity silyl modified polymer of 1:20,000 to 1:20.

In some embodiments, the at least one moisture scavenger comprises at least one vinylsilane.

In some embodiments, the adhesive formulation further includes at least one adhesion promoter, at least one catalyst, at least one filler, at least one plasticizer, at least one antioxidant, or any combination thereof.

In some embodiments, the at least one adhesion promoter is present in an amount of 1% to 15% by weight based on the total weight of the adhesive formulation.

In some embodiments, the least one adhesion promoter is present in the adhesive formulation in a weight ratio of the at least one adhesion promoter to the at least one high viscosity silyl modified polymer of 1:15 to 2:1.

In some embodiments, the at least one adhesion promoter comprises at least one aminosilane.

In some embodiments, the at least one adhesion promoter does not comprise N-(2-aminoethyl)-3-aminopropyltrimethoxysilane.

In some embodiments, the at least one adhesion promoter includes a first adhesion promoter and a second adhesive promoter. In some embodiments, the first adhesion promoter comprises at least one aminosilane. In some embodiments, the second adhesion promoter comprises at least one polyolefin.

In some embodiments, the at least one catalyst is present in the adhesive formulation in an amount of 0.1% to 5% by weight based on the total weight of the adhesive formulation.

In some embodiments, the at least one catalyst is present in the adhesive formulation in a weight ratio of the at least one catalyst to the at least one high viscosity silyl modified polymer of 1:1000 to 1:10.

In some embodiments, the at least one catalyst comprises at least one organometallic catalyst.

In some embodiments, the at least one organometallic catalyst comprises at least one organotitanium catalyst, at least one organotin catalyst, at least one organoaluminium catalyst, at least one organozirconium catalyst, or any combination thereof.

In some embodiments, the at least one catalyst does not comprise dibutyl tin bis (acetylacenoate).

In some embodiments, the at least one plasticizer is present in the adhesive formulation in an amount ranging from 1% to 50% by weight based on the total weight of the adhesive formulation.

In some embodiments, the at least one filler is present in the adhesive formulation in an amount ranging from 1% to 60% by weight based on the total weight of the adhesive formulation.

In some embodiments, the at least one antioxidant is present in an amount of 0.1% to 5% by weight based on the total weight of the adhesive formulation.

In some embodiments, the adhesive formulation exhibits a cure time of 1 to 30 hours.

In some embodiments, the viscosity of the adhesive formulation is an initial viscosity of the adhesive formulation, and wherein a test viscosity of the adhesive formulation is within ±40% of the initial viscosity after the adhesive formulation is aged for 28 days at 50° C., and wherein the test viscosity is measured according to ASTM D2196 using a Brookfield viscometer spindle number 6, at 20 rpm and 23° C.

In some embodiments, a sufficient amount of the adhesive formulation, as applied between at least one roofing membrane and at least one roof substrate, and after a sufficient amount of curing, results in a roofing system having a wind uplift resistance of at least 100 psf measured according to the 12×24 ft Wind Uplift Test at 23° C. and 50% relative humidity.

In some embodiments, a sufficient amount of the adhesive formulation, as applied between at least one roofing membrane and at least one roof substrate, and after a sufficient amount of curing, results in a roofing system having a wind uplift resistance of 100 psf to 250 psf measured according to the 12×24 ft Wind Uplift Test at 23° C. and 50% relative humidity.

In some embodiments, the sufficient amount of the adhesive formulation applied between the at least one roofing membrane and the at least one roof substrate is at least 0.001 gallons of the adhesive formulation per square foot of the at least one roofing membrane.

In some embodiments, the sufficient amount of the adhesive formulation applied between the at least one roofing membrane and the at least one roof substrate is from 0.001 gallons to 0.1 gallons of the adhesive formulation per square foot of the at least one roofing membrane.

In some embodiments, the adhesive formulation is free or substantially free of tackifiers.

In some embodiments, the adhesive formulation is free or substantially free of asphalt.

Some embodiments of the present disclosure relate to a method. In some embodiments, the method comprises applying an adhesive formulation to at least one roofing membrane, and bonding the at least one roofing membrane to at least one roof substrate using the adhesive formulation. In some embodiments, the adhesive formulation includes at least one high viscosity silyl modified polymer, at least one moisture scavenger, and at least one low viscosity silyl modified polymer. In some embodiments, the at least one high viscosity silyl modified polymer is present in the adhesive formulation in an amount ranging from 5% to 75% by weight based on a total weight of the adhesive formulation. In some embodiments, a high viscosity silyl modified polymer is a silyl modified polymer having a viscosity of 20,000 cP or higher measured according to ASTM D2196 using a Brookfield viscometer spindle number 6, at 20 rpm and 23° C. In some embodiments, the at least one moisture scavenger is present in the adhesive formulation in a sufficient amount, so as to result in a viscosity of the adhesive formulation of 5,000 cP to 30,000 cP measured according to ASTM D2196 using a Brookfield viscometer spindle number 6, at 20 rpm and at 23° C. In some embodiments, the at least one low viscosity silyl modified polymer is present in a weight ratio of the at least one low viscosity silyl modified polymer to the at least one high viscosity silyl modified polymer of less than 1:4. In some embodiments, a low viscosity silyl modified polymer is a silyl modified polymer with a viscosity of 10,000 cP or lower measured according to ASTM D2196 using a Brookfield viscometer spindle number 6, at 20 rpm and 23° C.

Some embodiments of the present disclosure relate to a roofing system. In some embodiments, the roofing system comprises at least one roofing membrane, at least one roof substrate; and an adhesive formulation. In some embodiments, the adhesive formulation is disposed between the at least one roofing membrane and the at least one roof substrate. In some embodiments, the adhesive formulation includes at least one high viscosity silyl modified polymer, at least one moisture scavenger, and at least one low viscosity silyl modified polymer. In some embodiments, the at least one high viscosity silyl modified polymer is present in the adhesive formulation in an amount ranging from 5% to 75% by weight based on a total weight of the adhesive formulation. In some embodiments, a high viscosity silyl modified polymer is a silyl modified polymer having a viscosity of 20,000 cP or higher measured according to ASTM D2196 using a Brookfield viscometer spindle number 6, at 20 rpm and 23° C. In some embodiments, the at least one moisture scavenger is present in the adhesive formulation in a sufficient amount, so as to result in a viscosity of the adhesive formulation of 5,000 cP to 30,000 cP measured according to ASTM D2196 using a Brookfield viscometer spindle number 6, at 20 rpm and at 23° C. In some embodiments, the at least one low viscosity silyl modified polymer is present in a weight ratio of the at least one low viscosity silyl modified polymer to the at least one high viscosity silyl modified polymer of less than 1:4. In some embodiments, a low viscosity silyl modified polymer is a silyl modified polymer with a viscosity of 10,000 cP or lower measured according to ASTM D2196 using a Brookfield viscometer spindle number 6, at 20 rpm and 23° C.

DETAILED DESCRIPTION

Some embodiments of the present disclosure an adhesive formulation comprising at least one silyl modified polymer.

As used herein a "silyl modified polymer" is any organic polymer that has been substituted with at least one silyl group. In some embodiments, a silyl modified polymer is a silyl terminated polymer. As used herein, "a silyl terminated polymer" is a silyl modified polymer where the substitution of the at least one silyl group is at an end of a chain of the polymer backbone.

As used herein, a "silyl group" has the general formula —$Si_nR_{2n+2}$, where R is hydrogen, an organic group, or any combination thereof. As used herein, a "silyl group" may also include any version of the aforementioned formula where at least one of the R sub-groups is substituted with an organic group. In some embodiments, the at least one silyl group is unsubstituted, such that all of the R sub-groups may be the same. In some embodiments, the at least one silyl group is substituted such that some of the R sub-groups may be the same while others may differ from each other. In some embodiments, the at least one silyl group is substituted such that all of the R sub-groups are different.

In some non-limiting embodiments, the at least one silyl group is a trimethoxysilyl group, a triethoxysilyl group, a tris(2-propenyloxy)silyl group, a triacetoxysilyl group, a methyldimethoxysilyl group, methyldiethoxysilyl group, a dimethoxyethyl silyl group, a (chloromethyl)dimethoxysilyl group, chloromethyl)diethoxysilyl group, a (methoxymethyl)dimethoxysilyl group, a (methoxymethyl)diethoxysilyl group, a (N,N-diethylaminomethyl)dimethoxysilyl group, a (N,N-diethylaminomethyl)diethoxysilyl group, or any combination thereof.

In some embodiments, the at least one silyl group is a hydrolyzable silyl group. As used herein, a "hydrolyzable silyl group" is a silyl group that includes at least one substituent R sub-group where, upon curing using a sufficient amount of moisture, the at least one substituent R sub-group undergoes hydrolysis, so as to form a bond with at least one surface (such as, but not limited to, at least one surface of a roofing membrane.) Non-limiting examples of at least one substituent R-sub-group that may be present in a hydrolyzable silyl group include: at least one hydrogen, at least one halide, at least one alkoxy group, at least one acyloxy group, at least one ketoximate group, at least one amino group, at least one amide group, at least one aminooxy, at least one mercapto group, at least one alkenyloxy group at least one alkoxy group (such as, but not limited to, at least one methoxy group, at least one ethoxy group, at least one propoxy group, or at least one isopropoxy group or any combination thereof.

In some embodiments, the at least one silyl modified polymer may be characterized by a specific polymer backbone. For instance, in some non-limiting embodiments, the at least one silyl modified polymer has a saturated hydrocarbon polymer backbone, a (meth)acrylic acid ester polymer backbone, or a polyoxyalkylene polymer backbone. In some embodiments, the polyoxyalkylene polymer backbone is a polyurethane backbone. In some embodiments the polyoxyalkylene polymer backbone is a polyether backbone. Commercially available examples of asilyl modified polymer with a polyether backbone include, but are not limited to KANEKA MS POLYMER® S327, KANEKA MS POLYMER® S227, KANEKA MS POLYMER® 5203H, and GENIOSIL® STP-E35. More specifically, GENIOSIL® STP-E35, is a non-limiting example of a trimethoxysilyl-propylcarbamate-terminated polyether. In some embodiments, the polyoxyalkylene polymer backbone may also be a polyoxyethylene backbone, a polyoxypropylene backbone, a polyoxybutylene backbone, a polyoxytetramethylene backbone, a polyoxyethylene-polyoxypropylene copolymer backbone, a polyoxypropylene-polyoxybutylene copolymer backbone, or any combination thereof.

In some embodiments, the at least one silyl modified polymer is a plurality of silyl modified polymers. In some embodiments, the plurality of silyl modified polymers is at least two silyl modified polymers. In some embodiments, the plurality of silyl modified polymers is at least three silyl modified polymers. In some embodiments, the plurality of silyl modified polymers is at least four silyl modified polymers. In some embodiments, the plurality of silyl modified polymers is at least five silyl modified polymers. In some embodiments, the plurality of silyl modified polymers is at least ten silyl modified polymers. In some embodiments, the plurality of silyl modified polymers is at least twenty silyl modified polymers. In some embodiments, each silyl modified polymer of the plurality of silyl modified polymers is the same. In some embodiments, each silyl modified polymer of the plurality of silyl modified polymers is different. In some embodiments, some silyl modified polymers of the plurality of silyl modified polymers are the same while others are different.

In some embodiments, the at least one silyl modified polymer is present in an amount an amount ranging from 1 wt % to 99 wt % by weight of the adhesive formulation. In some embodiments, the at least one silyl modified polymer is present in an amount an amount ranging from 5 wt % to 99 wt % by weight of the adhesive formulation. In some embodiments, the at least one silyl modified polymer is present in an amount an amount ranging from 10 wt % to 99 wt % by weight of the adhesive formulation. In some embodiments, the at least one silyl modified polymer is present in an amount an amount ranging from 20 wt % to 99 wt % by weight of the adhesive formulation. In some embodiments, the at least one silyl modified polymer is present in an amount an amount ranging from 30 wt % to 99 wt % by weight of the adhesive formulation. In some embodiments, the at least one silyl modified polymer is present in an amount an amount ranging from 40 wt % to 99 wt % by weight of the adhesive formulation. In some embodiments, the at least one silyl modified polymer is present in an amount an amount ranging from 50 wt % to 99 wt % by weight of the adhesive formulation. In some embodiments, the at least one silyl modified polymer is present in an amount an amount ranging from 60 wt % to 99 wt % by weight of the adhesive formulation. In some embodiments, the at least one silyl modified polymer is present in an amount an amount ranging from 70 wt % to 99 wt % by weight of the adhesive formulation. In some embodiments, the at least one silyl modified polymer is present in an amount an amount ranging from 80 wt % to 99 wt % by weight of the adhesive formulation. In some embodiments, the at least one silyl modified polymer is present in an amount an amount ranging from 90 wt % to 99 wt % by weight of the adhesive formulation. In some embodiments, the at least one silyl modified polymer is present in an amount an amount ranging from 95 wt % to 99 wt % by weight of the adhesive formulation.

In some embodiments, the at least one silyl modified polymer is present in an amount an amount ranging from 1 wt % to 95 wt % by weight of the adhesive formulation. In some embodiments, the at least one silyl modified polymer is present in an amount an amount ranging from 5 wt % to 95 wt % by weight of the adhesive formulation. In some embodiments, the at least one silyl modified polymer is present in an amount an amount ranging from 10 wt % to 95 wt % by weight of the adhesive formulation. In some embodiments, the at least one silyl modified polymer is present in an amount an amount ranging from 20 wt % to 95 wt % by weight of the adhesive formulation. In some embodiments, the at least one silyl modified polymer is present in an amount an amount ranging from 30 wt % to 95 wt % by weight of the adhesive formulation. In some embodiments, the at least one silyl modified polymer is present in an amount an amount ranging from 40 wt % to 95 wt % by weight of the adhesive formulation. In some embodiments, the at least one silyl modified polymer is present in an amount an amount ranging from 30 wt % to 95 wt % by weight of the adhesive formulation. In some embodiments, the at least one silyl modified polymer is present in an amount an amount ranging from 50 wt % to 95 wt % by weight of the adhesive formulation. In some embodiments, the at least one silyl modified polymer is present in an amount an amount ranging from 60 wt % to 95 wt % by weight of the adhesive formulation. In some embodiments, the at least one silyl modified polymer is present in an amount an amount ranging from 70 wt % to 95 wt % by weight of the adhesive formulation. In some embodiments, the at least one silyl modified polymer is present in an amount an amount ranging from 80 wt % to 95 wt % by weight of the adhesive formulation. In some embodiments, the at least one silyl modified polymer is present in an amount an amount ranging from 90 wt % to 95 wt % by weight of the adhesive formulation.

In some embodiments, the at least one silyl modified polymer is present in an amount an amount ranging from 5 wt % to 95 wt % by weight of the adhesive formulation. In some embodiments, the at least one silyl modified polymer is present in an amount an amount ranging from 10 wt % to 90 wt % by weight of the adhesive formulation. In some embodiments, the at least one silyl modified polymer is present in an amount an amount ranging from 20 wt % to 80 wt % by weight of the adhesive formulation. In some embodiments, the at least one silyl modified polymer is present in an amount an amount ranging from 30 wt % to 70 wt % by weight of the adhesive formulation. In some embodiments, the at least one silyl modified polymer is present in an amount an amount ranging from 40 wt % to 60 wt % by weight of the adhesive formulation.

In some embodiments, the at least one silyl modified polymer comprises, consists of, or consists essentially of at least one high viscosity silyl modified polymer. As defined herein, a high viscosity silyl modified polymer is a silyl modified polymer with a viscosity of X cP or higher, measured at 23° C. As further defined herein, the viscosity of the high viscosity silyl modified polymer is measured independently of the adhesive formulation.

In some embodiments, X is 20,000 cP, such that the at least one high viscosity silyl modified polymer present in the adhesive formulation has a viscosity of 20,000 cP or higher, measured at 23° C. In some embodiments, X is 30,000 cP, such that the at least one high viscosity silyl modified polymer present in the adhesive formulation has a viscosity of 30,000 cP or higher, measured at 23° C. In some embodiments, X is 40,000 cP, such that the at least one high viscosity silyl modified polymer present in the adhesive formulation has a viscosity of 40,000 cP or higher, measured at 23° C. In some embodiments, X is 50,000 cP, such that the at least one high viscosity silyl modified polymer present in the adhesive formulation has a viscosity of 50,000 cP or higher, measured at 23° C. In some embodiments, X is 60,000 cP, such that the at least one high viscosity silyl modified polymer present in the adhesive formulation has a viscosity of 60,000 cP or higher, measured at 23° C. In some embodiments, X is 70,000 cP, such that the at least one high viscosity silyl modified polymer present in the adhesive formulation has a viscosity of 70,000 cP or higher, measured at 23° C. In some embodiments, X is 80,000 cP, such that the at least one high viscosity silyl modified polymer present in the adhesive formulation has a viscosity of 80,000 cP or higher, measured at 23° C. In some embodiments, X is 90,000 cP, such that the at least one high viscosity silyl modified polymer present in the adhesive formulation has a viscosity of 90,000 cP or higher, measured at 23° C. In some embodiments, X is 100,000 cP, such that the at least one high viscosity silyl modified polymer present in the adhesive formulation has a viscosity of 100,000 cP or higher, measured at 23° C.

In some embodiments, the at least one high viscosity silyl modified polymer has a viscosity of 20,000 cP to 100,000 cP, measured at 23° C. In some embodiments, the at least one high viscosity silyl modified polymer has a viscosity of 30,000 cP to 100,000 cP, measured at 23° C. In some embodiments, the at least one high viscosity silyl modified polymer has a viscosity of 40,000 cP to 100,000 cP, measured at 23° C. In some embodiments, the at least one high viscosity silyl modified polymer has a viscosity of 50,000 cP to 100,000 cP, measured at 23° C. In some embodiments, the at least one high viscosity silyl modified polymer has a viscosity of 60,000 cP to 100,000 cP, measured at 23° C. In some embodiments, the at least one high viscosity silyl modified polymer has a viscosity of 70,000 cP to 100,000 cP, measured at 23° C. In some embodiments, the at least one high viscosity silyl modified polymer has a viscosity of 80,000 cP to 100,000 cP, measured at 23° C. In some embodiments, the at least one high viscosity silyl modified polymer has a viscosity of 90,000 cP to 100,000 cP, measured at 23° C.

In some embodiments, the at least one high viscosity silyl modified polymer has a viscosity of 20,000 cP to 90,000 cP, measured at 23° C. In some embodiments, the at least one high viscosity silyl modified polymer has a viscosity of 20,000 cP to 80,000 cP, measured at 23° C. In some embodiments, the at least one high viscosity silyl modified polymer has a viscosity of 20,000 cP to 70,000 cP, measured at 23° C. In some embodiments, the at least one high viscosity silyl modified polymer has a viscosity of 20,000 cP to 60,000 cP, measured at 23° C. In some embodiments, the at least one high viscosity silyl modified polymer has a viscosity of 20,000 cP to 50,000 cP, measured at 23° C. In some embodiments, the at least one high viscosity silyl modified polymer has a viscosity of 20,000 cP to 40,000 cP, measured at 23° C. In some embodiments, the at least one high viscosity silyl modified polymer has a viscosity of 20,000 cP to 30,000 cP, measured at 23° C.

In some embodiments, the at least one high viscosity silyl modified polymer has a viscosity of 30,000 cP to 90,000 cP, measured at 23° C. In some embodiments, the at least one high viscosity silyl modified polymer has a viscosity of 40,000 cP to 80,000 cP, measured at 23° C. In some embodiments, the at least one high viscosity silyl modified polymer has a viscosity of 50,000 cP to 70,000 cP, measured at 23° C.

Non-limiting commercial examples of the at least one high viscosity silyl modified polymer include, but are not limited to, KANEKA MS POLYMER® S327, KANEKA MS POLYMER® S227, KANEKA SILYL® SAX220, GENIOSIL® STP-E35, or any combination thereof.

In some specific non-limiting embodiments, the at least one high viscosity silyl modified polymer may have the following general formula:

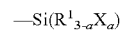

$$-Si(R^1{}_{3-a}X_a)$$

wherein $R^1$ represents an alkyl group having 1 to 20 carbon atoms, an aryl group having 6 to 20 carbon atoms, or an aralkyl group having 7 to 20 carbon atoms, wherein X represents a hydrolyzable group, wherein each X may be the same or different when two or more X are present, and wherein a represents 1, 2 or 3, wherein provided that when a is 1, each $R^1$ may be the same or different and wherein provided that when a is 2 or 3, each X may be the same or different.

Commercial examples of the at least one high viscosity silyl modified polymer having the above general formula include, but are not limited to, KANEKA MS POLYMER® S327, KANEKA MS POLYMER® S227, KANEKA SILYL® SAX220, or any combination thereof.

In some embodiments, the at least one high viscosity silyl modified polymer is a plurality of high viscosity silyl modified polymers. In some embodiments, the plurality of silyl modified polymers is at least two high viscosity silyl modified polymers. In some embodiments, the plurality of silyl modified polymers is at least three high viscosity silyl modified polymers. In some embodiments, the plurality of silyl modified polymers is at least four high viscosity silyl modified polymers. In some embodiments, the plurality of silyl modified polymers is at least five high viscosity silyl modified polymers. In some embodiments, the plurality of silyl modified polymers is at least ten high viscosity silyl modified polymers. In some embodiments, the plurality of silyl modified polymers is at least twenty high viscosity silyl modified polymers. In some embodiments, each high viscosity silyl modified polymer of the plurality of silyl modified polymers is the same. In some embodiments, each high viscosity silyl modified polymer of the plurality of silyl modified polymers is different. In some embodiments, some high viscosity silyl modified polymers of the plurality of high viscosity silyl modified polymers are the same while others are different.

In some embodiments, the at least one high viscosity silyl modified polymer is present in the adhesive formulation in an amount ranging from 5 wt % to 75 wt % by weight of the adhesive formulation. In some embodiments, the at least one high viscosity silyl modified polymer is pre sent in the adhesive formulation in an amount ranging from 10 wt % to 75 wt % by weight of the adhesive formulation. In some embodiments, the at least one high viscosity silyl modified polymer is present in the adhesive formulation in an amount ranging from 15 wt % to 75 wt % by weight of the adhesive formulation. In some embodiments, the at least one high viscosity silyl modified polymer is present in the adhesive formulation in an amount ranging from 15 wt % to 75 wt % by weight of the adhesive formulation. In some embodiments, the at least one high viscosity silyl modified polymer is present in the adhesive formulation in an amount ranging from 20 wt % to 75 wt % by weight of the adhesive formulation. In some embodiments, the at least one high viscosity silyl modified polymer is present in the adhesive formulation in an amount ranging from 25 wt % to 75 wt % by weight of the adhesive formulation. In some embodiments, the at least one high viscosity silyl modified polymer is present in the adhesive formulation in an amount ranging from 30 wt % to 75 wt % by weight of the adhesive formulation. In some embodiments, the at least one high viscosity silyl modified polymer is present in the adhesive formulation in an amount ranging from 35 wt % to 75 wt % by weight of the adhesive formulation. In some embodiments, the at least one high viscosity silyl modified polymer is present in the adhesive formulation in an amount ranging from 40 wt % to 75 wt % by weight of the adhesive formulation. In some embodiments, the at least one high viscosity silyl modified polymer is present in the adhesive formulation in an amount ranging from 45 wt % to 75 wt % by weight of the adhesive formulation. In some embodiments, the at least one high viscosity silyl modified polymer is present in the adhesive formulation in an amount ranging from 50 wt % to 75 wt % by weight of the adhesive formulation. In some embodiments, the at least one high viscosity silyl modified polymer is present in the adhesive formulation in an amount ranging from 55 wt % to 75 wt % by weight of the adhesive formulation. In some embodiments, the at least one high viscosity silyl modified polymer is present in the adhesive formulation in an amount ranging from 60 wt % to 75 wt % by weight of the adhesive formulation. In some embodiments, the at least one high viscosity silyl modified polymer is present in the adhesive formulation in an amount ranging from 65 wt % to 75 wt % by weight of the adhesive formulation. In some embodiments, the at least one high viscosity silyl modified polymer is present in the adhesive formulation in an amount ranging from 70 wt % to 75 wt % by weight of the adhesive formulation.

In some embodiments, the at least one high viscosity silyl modified polymer is present in the adhesive formulation in an amount ranging from 5 wt % to 70 wt % by weight of the adhesive formulation. In some embodiments, the at least one high viscosity silyl modified polymer is present in the adhesive formulation in an amount ranging from 5 wt % to 65 wt % by weight of the adhesive formulation. In some embodiments, the at least one high viscosity silyl modified polymer is present in the adhesive formulation in an amount ranging from 5 wt % to 60 wt % by weight of the adhesive formulation. In some embodiments, the at least one high viscosity silyl modified polymer is present in the adhesive formulation in an amount ranging from 5 wt % to 55 wt % by weight of the adhesive formulation. In some embodiments, the at least one high viscosity silyl modified polymer is present in the adhesive formulation in an amount ranging from 5 wt % to 50 wt % by weight of the adhesive formulation. In some embodiments, the at least one high viscosity silyl modified polymer is present in the adhesive formulation in an amount ranging from 5 wt % to 45 wt % by weight of the adhesive formulation. In some embodiments, the at least one high viscosity silyl modified polymer is present in the adhesive formulation in an amount ranging from 5 wt % to 40 wt % by weight of the adhesive formulation. In some embodiments, the at least one high viscosity silyl modified polymer is present in the adhesive formulation in an amount ranging from 5 wt % to 35 wt % by weight of the adhesive formulation. In some embodiments, the at least one high viscosity silyl modified polymer is present in the adhesive formulation in an amount ranging from 5 wt % to 30 wt % by weight of the adhesive formulation. In some embodiments, the at least one high viscosity silyl modified polymer is present in the adhesive formulation in an amount ranging from 5 wt % to 25 wt % by weight of the adhesive formulation. In some embodiments, the at least one high viscosity silyl modified polymer is present in the adhesive formulation in an amount ranging from 5 wt % to 20 wt % by weight of the adhesive formulation. In some embodiments, the at least one high viscosity silyl modified polymer is present in the adhesive formulation in an amount ranging from 5 wt % to 15 wt % by weight of the adhesive formulation. In some embodiments, the at least one high viscosity silyl modified polymer is present in the adhesive formulation in an amount ranging from 5 wt % to 10 wt % by weight of the adhesive formulation.

In some embodiments, the adhesive formulation comprises at least one low viscosity silyl modified polymer. As defined herein, a low viscosity silyl modified polymer is a silyl modified polymer with a viscosity of Y cP or lower, measured at 23° C. As further defined herein, the viscosity of the low viscosity silyl modified polymer is measured independently of the adhesive formulation.

In some embodiments, Y is 10,000 cP, such that the at least one low viscosity silyl modified polymer, when present in the adhesive formulation, has a viscosity of 10,000 cP or lower, measured at 23° C. In some embodiments, Y is 9,000 cP, such that the low viscosity silyl modified polymer has a viscosity of 9,000 cP or lower, measured at 23° C. In some embodiments, Y is 8,000 cP, such that the at least one low viscosity silyl modified polymer, when present in the adhesive formulation, has a viscosity of 8,000 cP or lower, measured at 23° C. In some embodiments, Y is 7,000 cP, such that the at least one low viscosity silyl modified polymer, when present in the adhesive formulation, has a viscosity of 7,000 cP or lower, measured at 23° C. In some embodiments, Y is 6,000 cP, such that the at least one low viscosity silyl modified polymer, when present in the adhesive formulation, has a viscosity of 6,000 cP or lower, measured at 23° C. In some embodiments, Y is 5,000 cP, such that the at least one low viscosity silyl modified polymer, when present in the adhesive formulation, has a viscosity of 5,000 cP or lower, measured at 23° C. In some embodiments, Y is 4,000 cP, such that the at least one low viscosity silyl modified polymer, when present in the adhesive formulation, has a viscosity of 4,000 cP or lower, measured at 23° C. In some embodiments, Y is 3,000 cP, such that the at least one low viscosity silyl modified polymer, when present in the adhesive formulation, has a viscosity of 3,000 cP or lower, measured at 23° C. In some embodiments, Y is 2,000 cP, such that the at least one low viscosity silyl modified polymer, when present in the adhesive formulation, has a viscosity of 2,000 cP or lower, measured at 23° C. In some embodiments, Y is 1,000 cP, such that the at least one low viscosity silyl modified polymer, when present in the adhesive formulation, has a viscosity of 1,000 cP or lower, measured at 23° C. In some embodiments, Y is 900 cP, such that the at least one low viscosity silyl modified polymer, when present in the adhesive formulation, has a viscosity of 900 cP or lower, measured at 23° C. In some embodiments, Y is 800 cP, such that the at least one low viscosity silyl modified polymer, when present in the adhesive formulation, has a viscosity of 800 cP or lower, measured at 23° C. In some embodiments, Y is 700 cP, such that the at least one low viscosity silyl modified polymer, when present in the adhesive formulation, has a viscosity of 700 cP or lower, measured at 23° C. In some embodiments, Y is 600 cP, such that the at least one low viscosity silyl modified polymer, when present in the adhesive formulation, has a viscosity of 600 cP or lower, measured at 23° C. In some embodiments, Y is 500 cP, such that the at least one low viscosity silyl modified polymer, when present in the adhesive formulation, has a viscosity of 500 cP or lower, measured at 23° C.

In some embodiments, the at least one low viscosity silyl modified polymer has a viscosity of 500 cP to 10,000 cP, measured at 23° C. In some embodiments, the at least one low viscosity silyl modified polymer has a viscosity of 1,000 cP to 10,000 cP, measured at 23° C. In some embodiments, the at least one low viscosity silyl modified polymer has a viscosity of 2,000 cP to 10,000 cP, measured at 23° C. In some embodiments, the at least one low viscosity silyl modified polymer has a viscosity of 3,000 cP to 10,000 cP, measured at 23° C. In some embodiments, the at least one low viscosity silyl modified polymer has a viscosity of 4,000 cP to 10,000 cP, measured at 23° C. In some embodiments, the at least one low viscosity silyl modified polymer has a viscosity of 5,000 cP to 10,000 cP, measured at 23° C. In some embodiments, the at least one low viscosity silyl modified polymer has a viscosity of 6,000 cP to 10,000 cP, measured at 23° C. In some embodiments, the at least one low viscosity silyl modified polymer has a viscosity of 7,000 cP to 10,000 cP, measured at 23° C. In some embodiments, the at least one low viscosity silyl modified polymer has a viscosity of 8,000 cP to 10,000 cP, measured at 23° C. In some embodiments, the at least one low viscosity silyl modified polymer has a viscosity of 9,000 cP to 10,000 cP, measured at 23° C.

In some embodiments, the at least one low viscosity silyl modified polymer has a viscosity of 500 cP to 9,000 cP, measured at 23° C. In some embodiments, the at least one low viscosity silyl modified polymer has a viscosity of 500 cP to 8,000 cP, measured at 23° C. In some embodiments, the at least one low viscosity silyl modified polymer has a viscosity of 500 cP to 7,000 cP, measured at 23° C. In some embodiments, the at least one low viscosity silyl modified polymer has a viscosity of 500 cP to 6,000 cP, measured at 23° C. In some embodiments, the at least one low viscosity silyl modified polymer has a viscosity of 500 cP to 5,000 cP, measured at 23° C. In some embodiments, the at least one low viscosity silyl modified polymer has a viscosity of 500 cP to 4,000 cP, measured at 23° C. In some embodiments, the at least one low viscosity silyl modified polymer has a viscosity of 500 cP to 3,000 cP, measured at 23° C. In some embodiments, the at least one low viscosity silyl modified polymer has a viscosity of 500 cP to 2,000 cP, measured at 23° C.

In some embodiments, the at least one low viscosity silyl modified polymer has a viscosity of 1,000 cP to 9,000 cP, measured at 23° C. In some embodiments, the at least one low viscosity silyl modified polymer has a viscosity of 2,000 cP to 9,000 cP, measured at 23° C. In some embodiments, the at least one low viscosity silyl modified polymer has a viscosity of 3,000 cP to 9,000 cP, measured at 23° C. In some embodiments, the at least one low viscosity silyl modified polymer has a viscosity of 4,000 cP to 9,000 cP, measured at 23° C. In some embodiments, the at least one low viscosity silyl modified polymer has a viscosity of 5,000 cP to 9,000 cP, measured at 23° C. In some embodiments, the at least one low viscosity silyl modified polymer has a viscosity of 6,000 cP to 9,000 cP, measured at 23° C. In some embodiments, the at least one low viscosity silyl modified polymer has a viscosity of 7,000 cP to 9,000 cP, measured at 23° C. In some embodiments, the at least one low viscosity silyl modified polymer has a viscosity of 8,000 cP to 9,000 cP, measured at 23° C.

In some embodiments, the at least one low viscosity silyl modified polymer has a viscosity of 1,000 cP to 8,000 cP, measured at 23° C. In some embodiments, the at least one low viscosity silyl modified polymer has a viscosity of 2,000 cP to 7,000 cP, measured at 23° C. In some embodiments, the at least one low viscosity silyl modified polymer has a viscosity of 3,000 cP to 6,000 cP, measured at 23° C. In some embodiments, the at least one low viscosity silyl modified polymer has a viscosity of 4,000 cP to 6,000 cP, measured at 23° C.

Non-limiting commercial examples of the at least one low viscosity silyl modified polymer include, but are not limited to, KANEKA SILYL® SAT145, KANEKA SILYL® SAT115, KANEKA MS POLYMER® 5203H, and Momentive® SPUR 3030.

In some specific non-limiting embodiments, the at least one low viscosity silyl modified polymer may have the following general formula:

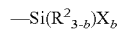

$$-\text{Si}(R^2_{3-b})X_b$$

wherein $R^2$ represents an alkyl group having 1 to 20 carbon atoms, an aryl group having 6 to 20 carbon atoms, or an aralkyl group having 7 to 20 carbon atoms, wherein X represents a hydrolyzable group, wherein each X may be the same or different when two or more X are present, and b represents 1, 2 or 3, provided that when b is 1, each $R_2$ may be the same or different and provided that when b is 2 or 3, each X may be the same or different.

Commercial examples of the at least one low viscosity silyl modified polymer having the above general formula include, but are not limited to, KANEKA SILYL® SAT145, KANEKA SILYL® SAT115, KANEKA MS POLYMER® 5203H, or any combination thereof.

In some embodiments the adhesive formulation does not comprise a low viscosity silyl modified polymer.

In some embodiments, the adhesive formulation comprises only one low viscosity silyl modified polymer. In some embodiments, the adhesive formulation comprises only at most two low viscosity silyl modified polymers. In some embodiments, the adhesive formulation comprises at most three low viscosity silyl modified polymers. In some embodiments, the adhesive formulation comprises at most four silyl modified polymers. In some embodiments, the adhesive formulation comprises at most five low viscosity silyl modified polymers.

In some embodiments, when at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of less than 1:Z.

As defined herein, the "weight ratio of the at least one low viscosity silyl modified polymer to the at least one high viscosity silyl modified polymer of less than 1:Z" is calculated as a ratio of the total weight of low viscosity silyl modified polymer in the adhesive formulation to the total weight of high viscosity silyl modified polymer in the adhesive formulation. As used herein, the "the total weight of high viscosity silyl modified polymer in the adhesive formulation" is either the weight of the high viscosity silyl modified polymer in the adhesive formulation (when only one high viscosity silyl modified polymer is present) or a sum of the weights of the high viscosity silyl modified polymer in the adhesive formulation (when more than one high viscosity silyl modified polymer is present). As used herein, the "the total weight of low viscosity silyl modified polymer in the adhesive formulation" is either the weight of the low viscosity silyl modified polymer in the adhesive formulation (when only one low viscosity silyl modified polymer is present) or a sum of the weights of the low viscosity silyl modified polymer in the adhesive formulation (when more than one low viscosity silyl modified polymer is present).

In some embodiments, the value of Z is 0.1, such that the weight ratio of the at least one low viscosity silyl modified polymer to the at least one high viscosity silyl modified polymer is less than 10:1. In some embodiments, the value of Z is 0.2, such that the weight ratio of the at least one low viscosity silyl modified polymer to the at least one high viscosity silyl modified polymer is less than 5:1. In some embodiments, the value of Z is 0.5, such that the weight ratio of the at least one low viscosity silyl modified polymer to the at least one high viscosity silyl modified polymer is less than 2:1. In some embodiments, the value of Z is 1, such that the weight ratio of the at least one low viscosity silyl modified polymer to the at least one high viscosity silyl modified polymer is less than 1:1. In some embodiments, the value of Z is 2, such that the weight ratio of the at least one low viscosity silyl modified polymer to the at least one high viscosity silyl modified polymer is less than 1:2. In some embodiments, the value of Z is 3, such that the weight ratio of the at least one low viscosity silyl modified polymer to the at least one high viscosity silyl modified polymer is less than 1:3. In some embodiments, the value of Z is 4, such that the weight ratio of the at least one low viscosity silyl modified polymer to the at least one high viscosity silyl modified polymer is less than 1:4. In some embodiments, the value of Z is 5, such that the weight ratio of the at least one low viscosity silyl modified polymer to the at least one high viscosity silyl modified polymer is less than 1:5. In some embodiments, the value of Z is 6, such that the weight ratio of the at least one low viscosity silyl modified polymer to the at least one high viscosity silyl modified polymer is less than 1:6. In some embodiments, the value of Z is 7, such that the weight ratio of the at least one low viscosity silyl modified polymer to the at least one high viscosity silyl modified polymer is less than 1:7. In some embodiments, the value of Z is 8, such that the weight ratio of the at least one low viscosity silyl modified polymer to the at least one high viscosity silyl modified polymer is less than 1:8. In some embodiments, the value of Z is 9, such that the weight ratio of the at least one low viscosity silyl modified polymer to the at least one high viscosity silyl modified polymer is less than 1:9. In some embodiments, the value of Z is 10, such that the weight ratio of the at least one low viscosity silyl modified polymer to the at least one high viscosity silyl modified polymer is less than 1:10.

In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 10:1. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:100 to 10:1. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:10 to 10:1. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:5 to 10:1. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1 to 10:1. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 2:1 to 10:1. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 5:1 to 10:1.

In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:1. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:2. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:3. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:4. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:5. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:6. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:7. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:8. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:9. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:10. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:50. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:100. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:1000 to 1:500.

In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:500 to 1:1. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:100 to 1:2. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:50 to 1:3. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:10 to 1:4. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:9 to 1:5. In some embodiments, when the at least one low viscosity silyl modified polymer is present in the adhesive formulation, the at least one low viscosity silyl modified polymer is present in a weight ratio of the at least one low viscosity silyl modified polymer to the at least one high viscosity silyl modified polymer of 1:8 to 1:6.

In some embodiments, when the at least one low viscosity silyl modified polymer is present in the adhesive formulation, the at least one low viscosity silyl modified polymer is present in an amount of 0.01 wt % to 10 wt % based on a total weight of the adhesive formulation. In some embodiments, when the at least one low viscosity silyl modified polymer is present in the adhesive formulation, the at least one low viscosity silyl modified polymer is present in an amount of 0.05 wt % to 10 wt % based on a total weight of the adhesive formulation. In some embodiments, when the at least one low viscosity silyl modified polymer is present in the adhesive formulation, the at least one low viscosity silyl modified polymer is present in an amount of 0.1 wt % to 10 wt % based on a total weight of the adhesive formulation. In some embodiments, when the at least one low viscosity silyl modified polymer is present in the adhesive formulation, the at least one low viscosity silyl modified polymer is present in an amount of 0.5 wt % to 10 wt % based on a total weight of the adhesive formulation. In some embodiments, when the at least one low viscosity silyl modified polymer is present in the adhesive formulation, the at least one low viscosity silyl modified polymer is present in an amount of 1 wt % to 10 wt % based on a total weight of the adhesive formulation. In some embodiments, when the at least one low viscosity silyl modified polymer is present in the adhesive formulation, the at least one low viscosity silyl modified polymer is present in an amount of 2 wt % to 10 wt % based on a total weight of the adhesive formulation. In some embodiments, when the at least one low viscosity silyl modified polymer is present in the adhesive formulation, the at least one low viscosity silyl modified polymer is present in an amount of 3 wt % to 10 wt % based on a total weight of the adhesive formulation. In some embodiments, when the at least one low viscosity silyl modified polymer is present in the adhesive formulation, the at least one low viscosity silyl modified polymer is present in an amount of 4 wt % to 10 wt % based on a total weight of the adhesive formulation. In some embodiments, when the at least one low viscosity silyl modified polymer is present in the adhesive formulation, the at least one low viscosity silyl modified polymer is present in an amount of 5 wt % to 10 wt % based on a total weight of the adhesive formulation. In some embodiments, when the at least one low viscosity silyl modified polymer is present in the adhesive formulation, the at least one low viscosity silyl modified polymer is present in an amount of 6 wt % to 10 wt % based on a total weight of the adhesive formulation. In some embodiments, when the at least one low viscosity silyl modified polymer is present in the adhesive formulation, the at least one low viscosity silyl modified polymer is present in an amount of 7 wt % to 10 wt % based on a total weight of the adhesive formulation. In some embodiments, when the at least one low viscosity silyl modified polymer is present in the adhesive formulation, the at least one low viscosity silyl modified polymer is present in an amount of 8 wt % to 10 wt % based on a total weight of the adhesive formulation. In some embodiments, when the at least one low viscosity silyl modified polymer is present in the adhesive formulation, the at least one low viscosity silyl modified polymer is present in an amount of 9 wt % to 10 wt % based on a total weight of the adhesive formulation.

In some embodiments, when the at least one low viscosity silyl modified polymer is present in the adhesive formulation, the at least one low viscosity silyl modified polymer is present in an amount of 0.01 wt % to 9 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 8 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 7 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 6 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 5 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 4 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 3 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 2 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 1 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 0.5 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 0.1 wt % based on a total weight of the adhesive formulation. In some embodiments, when the at least one low viscosity silyl modified polymer is present in the adhesive formulation, the at least one low viscosity silyl modified polymer is present in an amount of 0.01 wt % to 0.05 wt % based on a total weight of the adhesive formulation.

In some embodiments, when the at least one low viscosity silyl modified polymer is present in the adhesive formulation, the at least one low viscosity silyl modified polymer is present in an amount of 0.05 wt % to 9 wt % based on a total weight of the adhesive formulation. In some embodiments, when the at least one low viscosity silyl modified polymer is present in the adhesive formulation, the at least one low viscosity silyl modified polymer is present in an amount of 0.1 wt % to 8 wt % based on a total weight of the adhesive formulation. In some embodiments, when the at least one low viscosity silyl modified polymer is present in the adhesive formulation, the at least one low viscosity silyl modified polymer is present in an amount of 0.5 wt % to 7 wt % based on a total weight of the adhesive formulation. In some embodiments, when the at least one low viscosity silyl modified polymer is present in the adhesive formulation, the at least one low viscosity silyl modified polymer is present in an amount of 0.5 wt % to 7 wt % based on a total weight of the adhesive formulation.

In some embodiments, the adhesive formulation does not comprise a silyl modified polymer that has a viscosity of less than N at 23° C. In some embodiments, N is 20,000 cP such that the adhesive formulation does not comprise a silyl modified polymer that has a viscosity of less than 20,000 cP at 23° C. In some embodiments, N is 19,000 cP C such that the adhesive formulation does not comprise a silyl modified polymer that has a viscosity of less than 19,000 cP at 23° C. In some embodiments, N is 18,000 cP such that the adhesive formulation does not comprise a silyl modified polymer that has a viscosity of less than 18,000 cP. at 23° C. In some embodiments, N is 17,000 cP such that the adhesive formulation does not comprise a silyl modified polymer that has a viscosity of less than 17,000 cP at 23° C. In some embodiments, N is 16,000 cP such that the adhesive formulation does not comprise a silyl modified polymer that has a viscosity of less than 16,000 cP at 23° C. In some embodiments, N is 15,000 cP such that the adhesive formulation does not comprise a silyl modified polymer that has a viscosity of less than 15,000 cP at 23° C. In some embodiments, N is 14,000 cP such that the adhesive formulation does not comprise a silyl modified polymer that has a viscosity of less than 14,000 cP at 23° C. In some embodiments, N is 13,000 cP such that the adhesive formulation does not comprise a silyl modified polymer that has a viscosity of less than 13,000 cP at 23° C. In some embodiments, N is 12,000 cP such that the adhesive formulation does not comprise a silyl modified polymer that has a viscosity of less than 12,000 cP at 23° C. In some embodiments, N is 11,000 cP such that the adhesive formulation does not comprise a silyl modified polymer that has a viscosity of less than 11,000 cP at 23° C.

In some embodiments, the adhesive formulation does not comprise a silyl modified polymer that has a viscosity of M to L at 23° C. In some embodiments, M and L are 11,000 cP and 20,000 cP respectively, such that the adhesive formulation does not comprise a silyl modified polymer that has a viscosity of 11,000 cP to 20,000 cP at 23° C. In some embodiments, M and L are 12,000 cP and 20,000 cP respectively, such that the adhesive formulation does not comprise a silyl modified polymer that has a viscosity of 12,000 cP to 20,000 cP at 23° C. In some embodiments, M and L are 13,000 cP and 20,000 cP respectively, such that the adhesive formulation does not comprise a silyl modified polymer that has a viscosity of 13,000 cP to 20,000 cP at 23° C. In some embodiments, M and L are 14,000 cP and 20,000 cP respectively, such that the adhesive formulation does not comprise a silyl modified polymer that has a viscosity of 14,000 cP to 20,000 cP at 23° C. In some embodiments, M and L are 15,000 cP and 20,000 cP respectively, such that the adhesive formulation does not comprise a silyl modified polymer that has a viscosity of 15,000 cP to 20,000 cP at 23° C. In some embodiments, M and L are 16,000 cP and 20,000 cP respectively, such that the adhesive formulation does not comprise a silyl modified polymer that has a viscosity of 16,000 cP to 20,000 cP at 23° C. In some embodiments, M and L are 17,000 cP and 20,000 cP respectively, such that the adhesive formulation does not comprise a silyl modified polymer that has a viscosity of 17,000 cP to 20,000 cP at 23° C. In some embodiments, M and L are 18,000 cP and 20,000 cP respectively, such that the adhesive formulation does not comprise a silyl modified polymer that has a viscosity of 18,000 cP to 20,000 cP at 23° C. In some embodiments, M and L are 19,000 cP and 20,000 cP respectively, such that the adhesive formulation does not comprise a silyl modified polymer that has a viscosity of 19,000 cP to 20,000 cP at 23° C.

In some embodiments, M and L are 11,000 cP and 19,000 cP respectively, such that the adhesive formulation does not comprise a silyl modified polymer that has a viscosity of 11,000 cP to 19,000 cP at 23° C. In some embodiments, M and L are 11,000 cP and 18,000 cP respectively, such that the adhesive formulation does not comprise a silyl modified polymer that has a viscosity of 11,000 cP to 18,000 cP at 23° C. In some embodiments, M and L are 11,000 cP and 17,000 cP respectively, such that the adhesive formulation does not comprise a silyl modified polymer that has a viscosity of 11,000 cP to 17,000 cP at 23° C. In some embodiments, M and L are 11,000 cP and 16,000 cP respectively, such that the adhesive formulation does not comprise a silyl modified polymer that has a viscosity of 11,000 cP to 16,000 cP at 23° C. In some embodiments, M and L are 11,000 cP and 15,000 cP respectively, such that the adhesive formulation does not comprise a silyl modified polymer that has a viscosity of 11,000 cP to 15,000 cP at 23° C. In some embodiments, M and L are 11,000 cP and 14,000 cP respectively, such that the adhesive formulation does not comprise a silyl modified polymer that has a viscosity of 11,000 cP to 14,000 cP at 23° C. In some embodiments, the adhesive formulation does not comprise a silyl modified polymer that has a viscosity of 11,000 cP to 13,000 cP at 23° C. In some embodiments, M and L are 11,000 cP and 13,000 cP respectively, such that the adhesive formulation does not comprise a silyl modified polymer that has a viscosity of 11,000 cP to 12,000 cP at 23° C.

In some embodiments, M and L are 12,000 cP and 19,000 cP respectively, such that the adhesive formulation does not comprise a silyl modified polymer that has a viscosity of 12,000 cP to 19,000 cP at 23° C. In some embodiments, M and L are 13,000 cP and 18,000 cP respectively, such that the adhesive formulation does not comprise a silyl modified polymer that has a viscosity of 13,000 cP to 18,000 cP at 23° C. In some embodiments, M and L are 14,000 cP and 17,000 cP at respectively, such that the adhesive formulation does not comprise a silyl modified polymer that has a viscosity of 14,000 cP to 17,000 cP at 23° C. In some embodiments, M and L are 15,000 cP and 16,000 cP, such that the adhesive formulation does not comprise a silyl modified polymer that has a viscosity of 15,000 cP to 16,000 cP at 23° C.

In some embodiments, the adhesive formulation comprises at least one moisture scavenger.

In some embodiments, the at least one moisture scavenger is a plurality of moisture scavengers. In some embodiments, the plurality of moisture scavengers is at least two moisture scavengers. In some embodiments, the plurality of moisture scavengers is at least three moisture scavengers. In some embodiments, the plurality of moisture scavengers is at least four moisture scavengers. In some embodiments, the plurality of moisture scavengers is at least five moisture scavengers. In some embodiments, the plurality of moisture scavengers is at least ten moisture scavengers. In some embodiments, the plurality of moisture scavengers is at least twenty moisture scavengers. In some embodiments, each moisture scavenger of the plurality of moisture scavengers is the same. In some embodiments, each moisture scavenger of the plurality of moisture scavengers is different. In some embodiments, some moisture scavengers of the plurality of moisture scavengers are the same while others are different.

In some embodiments, the at least one moisture scavenger comprises at least one first moisture scavenger and at least one second moisture scavenger. The at least one first moisture scavenger and the at least one second moisture scavenger can each be any moisture scavenger described herein. In some embodiments, the at least one first moisture scavenger and the at least one second moisture scavenger are the same. In some embodiments, the at least one first moisture scavenger and the at least one second moisture scavenger are different.

Examples of moisture scavengers that may be suitable for some embodiments of the present disclosure include, but are not limited to, trimethyl orthoacetate, triethyl orthoformate, 3-ethyl-2-methyl-2-(3-methylbutyl)-1,3-oxazolidine, isobutyltriethoxysilane, isobutyltrimethoxysilane, n-octylsilane, methyltrimethoxysilane, trimethylmethoxysilane, n-octyltrimethoxysilane, dimethyldimethoxysilane, trimethylmethosysilane, n-propyltrimethoxysilane, tetraethylorthosilicate, dimethylketoximosilane, diisopropenoxy silane, methyl triisopropenoxy silane, γ-glycidoxypropyl methyl diisopropenoxy 3-ureidopropyltrimethoxy trimethylorthoacetate, trimethylorthoformate, or any combination thereof.

Additional examples of moisture scavengers that may be suitable for some embodiments of the present disclosure include, but are not limited to, ortho esters such as, but not limited to, trimethyl orthoacetate and triethyl orthoformate; and oxazolidine compounds such as, but not limited to, 3-ethyl-2-methyl-2-(3-methylbutyl)-1,3-oxazolidine.

In some embodiments, the at least one moisture scavenger comprises, consists of, or consists essentially of at least one silane.

Examples of silane moisture scavengers that may be suitable for some embodiments of the present disclosure include, but are not limited to, n-propyltrimethoxysilane, γ-mercaptopropylmethyldimethoxysilane, γ-mercaptopropylmethyldiethoxysilane, γ-glycidoxypropyltrimethoxysilane.

In some embodiments, the moisture scavenger comprises, consists of or consists essentially of at least one alkoxysilane. In some embodiments the at least one alkoxysilane moisture scavenger comprises n-propyl trimethoxysilane, octyltrimethoxysilane, or any combination thereof.

In some embodiments the moisture scavenger comprises, consists of, or consists essentially of at least one vinylsilane.

In some embodiments, the at least one vinylslane moisture scavenger comprises or is selected from the group consisting of dichloromethylvinylsilane, dimethoxymethylvinylsilane, diethoxymethylvinylsilane, vinyltriacetoxysilane,chlorodimethylvinylsilane, vinyltrichlorosilane, vinyltris(2-methoxyethoxy)silane, vinyltri(isopropoxy)silane, vinyltriacetoxysilane, or any combination thereof.

In some embodiments, the at least one vinylsilane moisture scavenger comprises, consists, or consists essentially of vinyltrimethoxysilane.

In some embodiments, the at least one moisture scavenger is present in the adhesive formulation in a sufficient amount, so as to result in a viscosity of the adhesive formulation of 5,000 cP to 30,000 cP measured at 23° C. using a Brookfield viscometer spindle number 6, at 20 rpm. In some embodiments, the at least one moisture scavenger is present in the adhesive formulation in a sufficient amount, so as to result in a viscosity of the adhesive formulation of 10,000 cP to 30,000 cP measured at 23° C. using a Brookfield viscometer spindle number 6, at 20 rpm. In some embodiments, the at least one moisture scavenger is present in the adhesive formulation in a sufficient amount, so as to result in a viscosity of the adhesive formulation of 15,000 cP to 30,000 cP measured at 23° C. using a Brookfield viscometer spindle number 6, at 20 rpm. In some embodiments, the at least one moisture scavenger is present in the adhesive formulation in a sufficient amount, so as to result in a viscosity of the adhesive formulation of 20,000 cP to 30,000 cP measured at 23° C. using a Brookfield viscometer spindle number 6, at 20 rpm. In some embodiments, the at least one moisture scavenger is present in the adhesive formulation in a sufficient amount, so as to result in a viscosity of the adhesive formulation of 25,000 cP to 30,000 cP measured at 23° C. using a Brookfield viscometer spindle number 6, at 20 rpm.

In some embodiments, the at least one moisture scavenger is present in the adhesive formulation in a sufficient amount, so as to result in a viscosity of the adhesive formulation of 5,000 cP to 25,000 cP measured at 23° C. using a Brookfield viscometer spindle number 6, at 20 rpm. In some embodiments, the at least one moisture scavenger is present in the adhesive formulation in a sufficient amount, so as to result in a viscosity of the adhesive formulation of 5,000 cP to 20,000 cP measured at 23° C. using a Brookfield viscometer spindle number 6, at 20 rpm. In some embodiments, the at least one moisture scavenger is present in the adhesive formulation in a sufficient amount, so as to result in a viscosity of the adhesive formulation of 5,000 cP to 15,000 cP measured at 23° C. using a Brookfield viscometer spindle number 6, at 20 rpm. In some embodiments, the at least one moisture scavenger is present in the adhesive formulation in a sufficient amount, so as to result in a viscosity of the adhesive formulation of 5,000 cP to 10,000 cP measured at 23° C. using a Brookfield viscometer spindle number 6, at 20 rpm.

In some embodiments, the at least one moisture scavenger is present in the adhesive formulation in a sufficient amount, so as to result in a viscosity of the adhesive formulation of 10,000 cP to 25,000 cP measured at 23° C. using a Brookfield viscometer spindle number 6, at 20 rpm. In some embodiments, the at least one moisture scavenger is present in the adhesive formulation in a sufficient amount, so as to result in a viscosity of the adhesive formulation of 15,000 cP to 20,000 cP measured at 23° C. using a Brookfield viscometer spindle number 6, at 20 rpm.

In some embodiments, the sufficient amount of the at least one moisture scavenger is a weight ratio of the at least one moisture scavenger to the at least one high viscosity silyl modified polymer of 1:20 to 1:2. In some embodiments, the sufficient amount of the at least one moisture scavenger is a weight ratio of the at least one moisture scavenger to the at least one high viscosity silyl modified polymer of 1:15 to 1:2. In some embodiments, the sufficient amount of the at least one moisture scavenger is a weight ratio of the at least one moisture scavenger to the at least one high viscosity silyl modified polymer of 1:10 to 1:2. In some embodiments, the sufficient amount of the at least one moisture scavenger is a weight ratio of the at least one moisture scavenger to the at least one high viscosity silyl modified polymer of 1:5 to 1:2.

In some embodiments, the sufficient amount of the at least one moisture scavenger is a weight ratio of the at least one moisture scavenger to the at least one high viscosity silyl modified polymer of 1:20 to 1:5. In some embodiments, the sufficient amount of the at least one moisture scavenger is a weight ratio of the at least one moisture scavenger to the at least one high viscosity silyl modified polymer of 1:20 to 1:10. In some embodiments, the sufficient amount of the at least one moisture scavenger is a weight ratio of the at least one moisture scavenger to the at least one high viscosity silyl modified polymer of 1:20 to 1:15.

In some embodiments, the sufficient amount of the at least one moisture scavenger is a weight ratio of the at least one moisture scavenger to the at least one high viscosity silyl modified polymer of 1:15 to 1:5. In some embodiments, the sufficient amount of the at least one moisture scavenger is a weight ratio of the at least one moisture scavenger to the at least one high viscosity silyl modified polymer of 1:15 to 1:10. In some embodiments, the sufficient amount of the at least one moisture scavenger is a weight ratio of the at least one moisture scavenger to the at least one high viscosity silyl modified polymer of 1:10 to 1:5.

In some embodiments, the sufficient amount of the at least one moisture scavenger is 0.75 wt % to 10 wt % by weight of the adhesive formulation. In some embodiments, the sufficient amount of the at least one moisture scavenger is 1 wt % to 10 wt % by weight of the adhesive formulation. In some embodiments, the sufficient amount of the at least one moisture scavenger is 2 wt % to 10 wt % by weight of the adhesive formulation. In some embodiments, the sufficient amount of the at least one moisture scavenger is 5 wt % to 10 wt % by weight of the adhesive formulation. In some embodiments, the sufficient amount of the at least one moisture scavenger is 9 wt % to 10 wt % by weight of the adhesive formulation.

In some embodiments, the sufficient amount of the at least one moisture scavenger is 0.75 wt % to 9 wt % by weight of the adhesive formulation. In some embodiments, the sufficient amount of the at least one moisture scavenger is 0.75 wt % to 5 wt % by weight of the adhesive formulation. In some embodiments, the sufficient amount of the at least one moisture scavenger is 0.75 wt % to 2 wt % by weight of the adhesive formulation. In some embodiments, the sufficient amount of the at least one moisture scavenger is 0.75 wt % to 1 wt % by weight of the adhesive formulation.

In some embodiments, the sufficient amount of the at least one moisture scavenger is 1 wt % to 9 wt % by weight of the adhesive formulation. In some embodiments, the sufficient amount of the at least one moisture scavenger is 2 wt % to 5 wt % by weight of the adhesive formulation.

In some embodiments the sufficient amount of the at least one moisture scavenger is a molar ratio of the at least one moisture scavenger to the at least one high viscosity silyl modified polymer of 1:20,000 to 1:20. In some embodiments the sufficient amount of the at least one moisture scavenger is a molar ratio of the at least one moisture scavenger to the at least one high viscosity silyl modified polymer of 1:2000 to 1:20. In some embodiments the sufficient amount of the at least one moisture scavenger is a molar ratio of the at least one moisture scavenger to the at least one high viscosity silyl modified polymer of 1:200 to 1:20. In some embodiments the sufficient amount of the at least one moisture scavenger is a molar ratio of the at least one moisture scavenger to the at least one high viscosity silyl modified polymer of 1:100 to 1:20. In some embodiments the sufficient amount of the at least one moisture scavenger is a molar ratio of the at least one moisture scavenger to the at least one high viscosity silyl modified polymer of 1:50 to 1:20. In some embodiments the sufficient amount of the at least one moisture scavenger is a molar ratio of the at least one moisture scavenger to the at least one high viscosity silyl modified polymer of 1:25 to 1:20.

In some embodiments the sufficient amount of the at least one moisture scavenger is a molar ratio of the at least one moisture scavenger to the at least one high viscosity silyl modified polymer of 1:20,000 to 1:25. In some embodiments the sufficient amount of the at least one moisture scavenger is a molar ratio of the at least one moisture scavenger to the at least one high viscosity silyl modified polymer of 1:20,000 to 1:50. In some embodiments the sufficient amount of the at least one moisture scavenger is a molar ratio of the at least one moisture scavenger to the at least one high viscosity silyl modified polymer of 1:20,000 to 1:100. In some embodiments the sufficient amount of the at least one moisture scavenger is a molar ratio of the at least one moisture scavenger to the at least one high viscosity silyl modified polymer of 1:20,000 to 1:200. In some embodiments the sufficient amount of the at least one moisture scavenger is a molar ratio of the at least one moisture scavenger to the at least one high viscosity silyl modified polymer of 1:20,000 to 1:2000.

In some embodiments the sufficient amount of the at least one moisture scavenger is a molar ratio of the at least one moisture scavenger to the at least one high viscosity silyl modified polymer of 1:2000 to 1:25. In some embodiments the sufficient amount of the at least one moisture scavenger is a molar ratio of the at least one moisture scavenger to the at least one high viscosity silyl modified polymer of 1:200 to 1:50. In some embodiments the sufficient amount of the at least one moisture scavenger is a molar ratio of the at least one moisture scavenger to the at least one high viscosity silyl modified polymer of 1:200 to 1:100. In some embodiments the sufficient amount of the at least one moisture scavenger is a molar ratio of the at least one moisture scavenger to the at least one high viscosity silyl modified polymer of 1:100 to 1:50.

In some embodiments, the adhesive formulation comprises at least one adhesion promoter.

In some embodiments, the at least adhesion promoter is a plurality of adhesion promoters. In some embodiments, the plurality of adhesion promoters is at least two adhesion promoters. In some embodiments, the plurality of adhesion promoters is at least three adhesion promoters. In some embodiments, the plurality of adhesion promoters is at least four adhesion promoters. In some embodiments, the plurality of adhesion promoters is at least five adhesion promoters. In some embodiments, the plurality of adhesion promoters is at least ten adhesion promoters. In some embodiments, the plurality of adhesion promoters is at least twenty adhesion promoters. In some embodiments, each adhesion promoter of the plurality of adhesion promoters is the same. In some embodiments, each adhesion promoter of the plurality of adhesion promoters is different. In some embodiments, some adhesion promoters of the plurality of adhesion promoters are the same while others are different.

In some embodiments, the at least one adhesion promoter comprises at least one first adhesion promoter and at least one second adhesion promoter. The at least one first adhesion promoter and the at least one second adhesion promoter can each be any adhesion promoter described herein. In some embodiments, the at least one first adhesion promoter and the at least one second adhesion promoter are the same. In some embodiments, the at least one first adhesion promoter and the at least one second adhesion promoter are different.

Examples of adhesion promoters that may be suitable for some embodiments of the present disclosure include, but are not limited to adhesion promoters include acrylics, acids, anhydrides, epoxies, polyamides, methylacrylates, phenolic resins, polyisocyanates, or any combination thereof.

In some embodiments, the at least one adhesion promoter comprises, consists of, or consists essentially of at least one silane.

Examples of silane adhesion promoters that may be suitable for some embodiments of the present disclosure include silane adhesion promoters. Examples of silane adhesion promoters include but are not limited to γ-isocyanatopropyltrimethoxysilane, ethoxysilane, γ-isocyanatopropylmethyldimethoxysilane, α-isocyanatomethyltrimethoxysilane, α-isocyanatomethyldimethoxymethylsilane; γ-mercaptopropyltrimethoxysilane, γ-mercaptopropyltriethoxysilane, γ-mercaptopropylmethyldimethoxysilane, γ-glycidoxypropyltrimethoxysilane β-(3,4-epoxycyclohexyl)ethyltrimethoxysilane), or any combination thereof.

Additional examples of adhesion promoters that may be suitable for some embodiments of the present disclosure may include at least one polyolefin adhesion promoter, such as but not limited to at least one chlorinated polyolefin adhesion promoter. In some embodiments, the at least one polyolefin adhesion promoter further comprises a solvent carrier. In some embodiments, the at least one polyolefin adhesion promoter may be solvent free. Non-limiting examples of polyolefin adhesion promoters include modified chlorinated polyolefin copolymer (commercially available as AdvaBond® 7200), modified polyolefin with maleic anhydride (commercially available as AdvaBond® 7419 or AdvaBond® 7426), modified chlorine free polyolefin (commercially available as AdvaBond® 8117-30), maleic anhydride modified chlorinated polypropylene with a xylene solvent carrier (commercially available as AdvaBond® 8203), maleic anhydride modified chlorinated polypropylene(commercially available as AdvaBond® 8214), or any combination thereof.

In some embodiments, the at least one adhesion promoter may comprise, consist or consist essentially of at least one aminosilane.

In some embodiments, the at least one aminosilane adhesion promoter may comprise N-(2-aminoethyl)-3-aminopropyltrimethoxysilane, which, in some non-limiting embodiments is commercially available as DAMO-T from Dynalsylan®. In some specific non-limiting embodiments, the at least one amino silane adhesion promoter does not comprise N-(2-aminoethyl)-3-aminopropyltrimethoxysilane.

In some embodiments, the at least one aminosilane adhesion promoter comprises or is selected from the group consisting of 3-aminopropyl-dimethoxymethylsilane, 3-amino-2-methylpropyltrimethoxysilane, 4-aminobutyltrimethoxysilane, 4-aminobutyldimethoxymethylsilane, 4-amino-3-methylbutyl-trimethoxysilane, 4-amino-3,3-dimethylbutyltrimethoxysilane, 4-amino-3,3-di-methylbutyldimethoxymethylsilane, 2-aminoethyltrimethoxysilane, 2-amino-ethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethyl-aminomethyldimethoxymethylsilane, N-propylaminomethyldimethoxymethyl-silane, N-butylaminomethyldimethoxymethylsilane; N-(2-aminoethyl)-3-aminopropyltrimethoxysilane, 3-[2-(2-aminoethylamino)ethylamino]propyltrimethoxysilane, bis(trimethoxysilylpropyl)amine, or any combination thereof.

In some embodiments, the at least one aminosilane adhesion promoter comprises, consists or consists essentially of 3-aminopropyltrimethoxysilane. A non-limiting example of a commercially available form of 3-aminopropyltrimethoxysilane is GENIOSIL® GF 96.

In some embodiments, the least one adhesion promoter is present in the adhesive formulation in a weight ratio of the at least one adhesion promoter to the at least one high viscosity silyl modified polymer of 1:15 to 2:1. In some embodiments, the least one adhesion promoter is present in the adhesive formulation in a weight ratio of the at least one adhesion promoter to the at least one high viscosity silyl modified polymer of 1:10 to 2:1. In some embodiments, the least one adhesion promoter is present in the adhesive formulation in a weight ratio of the at least one adhesion promoter to the at least one high viscosity silyl modified polymer of 1:5 to 2:1. In some embodiments, the least one adhesion promoter is present in the adhesive formulation in a weight ratio of the at least one adhesion promoter to the at least one high viscosity silyl modified polymer of 1:2 to 2:1. In some embodiments, the least one adhesion promoter is present in the adhesive formulation in a weight ratio of the at least one adhesion promoter to the at least one high viscosity silyl modified polymer of 1:1 to 2:1. In some embodiments, the least one adhesion promoter is present in the adhesive formulation in a weight ratio of the at least one adhesion promoter to the at least one high viscosity silyl modified polymer of 3:2 to 2:1.

In some embodiments, the least one adhesion promoter is present in the adhesive formulation in a weight ratio of the at least one adhesion promoter to the at least one high viscosity silyl modified polymer of 1:15 to 3:2. In some embodiments, the least one adhesion promoter is present in the adhesive formulation in a weight ratio of the at least one adhesion promoter to the at least one high viscosity silyl modified polymer of 1:15 to 1:1. In some embodiments, the least one adhesion promoter is present in the adhesive formulation in a weight ratio of the at least one adhesion promoter to the at least one high viscosity silyl modified polymer of 1:15 to 1:2. In some embodiments, the least one adhesion promoter is present in the adhesive formulation in a weight ratio of the at least one adhesion promoter to the at least one high viscosity silyl modified polymer of 1:15 to 1:5. In some embodiments, the least one adhesion promoter is present in the adhesive formulation in a weight ratio of the at least one adhesion promoter to the at least one high viscosity silyl modified polymer of 1:15 to 1:10.

In some embodiments, the least one adhesion promoter is present in the adhesive formulation in a weight ratio of the at least one adhesion promoter to the at least one high viscosity silyl modified polymer of 1:10 to 3:2. In some embodiments, the least one adhesion promoter is present in the adhesive formulation in a weight ratio of the at least one adhesion promoter to the at least one high viscosity silyl modified polymer of 1:5 to 1:1. In some embodiments, the least one adhesion promoter is present in the adhesive formulation in a weight ratio of the at least one adhesion promoter to the at least one high viscosity silyl modified polymer of 1:5 to 1:2. In some embodiments, the least one adhesion promoter is present in the adhesive formulation in a weight ratio of the at least one adhesion promoter to the at least one high viscosity silyl modified polymer of 1:2 to 1:1.

In some embodiments, the at least one adhesion promoter is present in the adhesive formulation in an amount of 1 wt % to 15 wt % of the adhesive formulation. In some embodiments, the at least one adhesion promoter is present in the adhesive formulation in an amount of 2 wt % to 15 wt % of the adhesive formulation. In some embodiments, the at least one adhesion promoter is present in the adhesive formulation in an amount of 3 wt % to 15 wt % of the adhesive formulation. In some embodiments, the at least one adhesion promoter is present in the adhesive formulation in an amount of 4 wt % to 15 wt % of the adhesive formulation. In some embodiments, the at least one adhesion promoter is present in the adhesive formulation in an amount of 5 wt % to 15 wt % of the adhesive formulation. In some embodiments, the at least one adhesion promoter is present in the adhesive formulation in an amount of 6 wt % to 15 wt % of the adhesive formulation. In some embodiments, the at least one adhesion promoter is present in the adhesive formulation in an amount of 7 wt % to 15 wt % of the adhesive formulation. In some embodiments, the at least one adhesion promoter is present in the adhesive formulation in an amount of 8 wt % to 15 wt % of the adhesive formulation. In some embodiments, the at least one adhesion promoter is present in the adhesive formulation in an amount of 9 wt % to 15 wt % of the adhesive formulation. In some embodiments, the at least one adhesion promoter is present in the adhesive formulation in an amount of 10 wt % to 15 wt % of the adhesive formulation. In some embodiments, the at least one adhesion promoter is present in the adhesive formulation in an amount of 11 wt % to 15 wt % of the adhesive formulation. In some embodiments, the at least one adhesion promoter is present in the adhesive formulation in an amount of 12 wt % to 15 wt % of the adhesive formulation. In some embodiments, the at least one adhesion promoter is present in the adhesive formulation in an amount of 13 wt % to 15 wt % of the adhesive formulation. In some embodiments, the at least one adhesion promoter is present in the adhesive formulation in an amount of 14 wt % to 15 wt % of the adhesive formulation.

In some embodiments, the at least one adhesion promoter is present in the adhesive formulation in an amount of 1 wt % to 14 wt % of the adhesive formulation. In some embodiments, the at least one adhesion promoter is present in the adhesive formulation in an amount of 1 wt % to 13 wt % of the adhesive formulation. In some embodiments, the at least one adhesion promoter is present in the adhesive formulation in an amount of 1 wt % to 12 wt % of the adhesive formulation. In some embodiments, the at least one adhesion promoter is present in the adhesive formulation in an amount of 1 wt % to 11 wt % of the adhesive formulation. In some embodiments, the at least one adhesion promoter is present in the adhesive formulation in an amount of 1 wt % to 10 wt % of the adhesive formulation. In some embodiments, the at least one adhesion promoter is present in the adhesive formulation in an amount of 1 wt % to 9 wt % of the adhesive formulation. In some embodiments, the at least one adhesion promoter is present in the adhesive formulation in an amount of 1 wt % to 8 wt % of the adhesive formulation. In some embodiments, the at least one adhesion promoter is present in the adhesive formulation in an amount of 1 wt % to 7 wt % of the adhesive formulation. In some embodiments, the at least one adhesion promoter is present in the adhesive formulation in an amount of 1 wt % to 6 wt % of the adhesive formulation. In some embodiments, the at least one adhesion promoter is present in the adhesive formulation in an amount of 1 wt % to 5 wt % of the adhesive formulation. In some embodiments, the at least one adhesion promoter is present in the adhesive formulation in an amount of 1 wt % to 4 wt % of the adhesive formulation. In some embodiments, the at least one adhesion promoter is present in the adhesive formulation in an amount of 1 wt % to 3 wt % of the adhesive formulation. In some embodiments, the at least one adhesion promoter is present in the adhesive formulation in an amount of 1 wt % to 2 wt % of the adhesive formulation.

In some embodiments, the at least one adhesion promoter is present in the adhesive formulation in an amount of 2 wt % to 14 wt % of the adhesive formulation. In some embodiments, the at least one adhesion promoter is present in the adhesive formulation in an amount of 3 wt % to 13 wt % of the adhesive formulation. In some embodiments, the at least one adhesion promoter is present in the adhesive formulation in an amount of 4 wt % to 12 wt % of the adhesive formulation. In some embodiments, the at least one adhesion promoter is present in the adhesive formulation in an amount of 5 wt % to 11 wt % of the adhesive formulation. In some embodiments, the at least one adhesion promoter is present in the adhesive formulation in an amount of 6 wt % to 10 wt % of the adhesive formulation. In some embodiments, the at least one adhesion promoter is present in the adhesive formulation in an amount of 7 wt % to 9 wt % of the adhesive formulation.

In some embodiments, the at least one adhesion promoter comprises at least one first adhesion promoter and at least one second adhesion promoter. In some embodiments, the at least one first adhesion promoter comprises at least one aminosilane and the at least one second adhesion promoter comprises the at least one polyolefin. In some embodiments, the first adhesion promoter comprises 3-aminopropyltrimethoxysilane and the second adhesion promoter comprises maleic anhydride modified chlorinated polypropylene.

In some embodiments, the least one first adhesion promoter is present in the adhesive formulation in a weight ratio of the at least one first adhesion promoter to the at least one high viscosity silyl modified polymer of 1:15 to 1:1. In some embodiments, the least one first adhesion promoter is present in the adhesive formulation in a weight ratio of the at least one first adhesion promoter to the at least one high viscosity silyl modified polymer of 1:10 to 1:1. In some embodiments, the least one first adhesion promoter is present in the adhesive formulation in a weight ratio of the at least one first adhesion promoter to the at least one high viscosity silyl modified polymer of 1:5 to 1:1. In some embodiments, the least one first adhesion promoter is present in the adhesive formulation in a weight ratio of the at least one first adhesion promoter to the at least one high viscosity silyl modified polymer of 1:2 to 1:1.

In some embodiments, the least one first adhesion promoter is present in the adhesive formulation in a weight ratio of the at least one first adhesion promoter to the at least one high viscosity silyl modified polymer of 1:15 to 1:2. In some embodiments, the least one first adhesion promoter is present in the adhesive formulation in a weight ratio of the at least one first adhesion promoter to the at least one high viscosity silyl modified polymer of 1:15 to 1:5. In some embodiments, the least one first adhesion promoter is present in the adhesive formulation in a weight ratio of the at least one first adhesion promoter to the at least one high viscosity silyl modified polymer of 1:15 to 1:10.

In some embodiments, the least one first adhesion promoter is present in the adhesive formulation in a weight ratio of the at least one first adhesion promoter to the at least one high viscosity silyl modified polymer of 1:10 to 1:2. In some embodiments, the least one first adhesion promoter is present in the adhesive formulation in a weight ratio of the at least one first adhesion promoter to the at least one high viscosity silyl modified polymer of 1:10 to 1:5. In some embodiments, the least one first adhesion promoter is present in the adhesive formulation in a weight ratio of the at least one first adhesion promoter to the at least one high viscosity silyl modified polymer of 1:5 to 1:2.

In some embodiments, the adhesive formulation comprises the at least one first adhesion promoter in an amount ranging from 1 wt % to 10 wt % based on a total weight of the adhesive formulation. In some embodiments, the adhesive formulation comprises the at least one first adhesion promoter in an amount ranging from 2 wt % to 10 wt % based on a total weight of the adhesive formulation. In some embodiments, the adhesive formulation comprises the at least one first adhesion promoter in an amount ranging from 3 wt % to 10 wt % based on a total weight of the adhesive formulation. In some embodiments, the adhesive formulation comprises the at least one first adhesion promoter in an amount ranging from 4 wt % to 10 wt % based on a total weight of the adhesive formulation. In some embodiments, the adhesive formulation comprises the at least one first adhesion promoter in an amount ranging from 5 wt % to 10 wt % based on a total weight of the adhesive formulation. In some embodiments, the adhesive formulation comprises the at least one first adhesion promoter in an amount ranging from 6 wt % to 10 wt % based on a total weight of the adhesive formulation. In some embodiments, the adhesive formulation comprises the at least one first adhesion promoter in an amount ranging from 7 wt % to 10 wt % based on a total weight of the adhesive formulation. In some embodiments, the adhesive formulation comprises the at least one first adhesion promoter in an amount ranging from 8 wt % to 10 wt % based on a total weight of the adhesive formulation. In some embodiments, the adhesive formulation comprises the at least one first adhesion promoter in an amount ranging from 9 wt % to 10 wt % based on a total weight of the adhesive formulation.

In some embodiments, the adhesive formulation comprises the at least one first adhesion promoter in an amount ranging from 1 wt % to 9 wt % based on a total weight of the adhesive formulation. In some embodiments, the adhesive formulation comprises the at least one first adhesion promoter in an amount ranging from 1 wt % to 8 wt % based on a total weight of the adhesive formulation. In some embodiments, the adhesive formulation comprises the at least one first adhesion promoter in an amount ranging from 1 wt % to 7 wt % based on a total weight of the adhesive formulation. In some embodiments, the adhesive formulation comprises the at least one first adhesion promoter in an amount ranging from 1 wt % to 6 wt % based on a total weight of the adhesive formulation. In some embodiments, the adhesive formulation comprises the at least one first adhesion promoter in an amount ranging from 1 wt % to 5 wt % based on a total weight of the adhesive formulation. In some embodiments, the adhesive formulation comprises the at least one first adhesion promoter in an amount ranging from 1 wt % to 4 wt % based on a total weight of the adhesive formulation. In some embodiments, the adhesive formulation comprises the at least one first adhesion promoter in an amount ranging from 1 wt % to 3 wt % based on a total weight of the adhesive formulation. In some embodiments, the adhesive formulation comprises the at least one first adhesion promoter in an amount ranging from 1 wt % to 2 wt % based on a total weight of the adhesive formulation.

In some embodiments, the adhesive formulation comprises the at least one first adhesion promoter in an amount ranging from 2 wt % to 9 wt % based on a total weight of the adhesive formulation. In some embodiments, the adhesive formulation comprises the at least one first adhesion promoter in an amount ranging from 3 wt % to 8 wt % based on a total weight of the adhesive formulation. In some embodiments, the adhesive formulation comprises the at least one first adhesion promoter in an amount ranging from 4 wt % to 7 wt % based on a total weight of the adhesive formulation. In some embodiments, the adhesive formulation comprises the at least one first adhesion promoter in an amount ranging from 5 wt % to 6 wt % based on a total weight of the adhesive formulation.

In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:5 to 2:1. In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:2 to 2:1. In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:1 to 2:1. In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 3:2 to 2:1.

In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:5 to 3:2. In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:5 to 1:1. In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:5 to 1:2.

In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:2 to 3:2. In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:1 to 3:2. In some embodiments, when the adhesive formulation comprises the at least one second adhesion promoter, the at least one second adhesion promoter is present in the adhesive formulation in a weight ratio of the at least one second adhesion promoter to the at least one high viscosity silyl modified polymer of 1:2 to 1:1.

In some embodiments, when the adhesive formulation comprises the at least one second adhesion promoter, the at least one second adhesion promoter is present in an amount ranging from 2 wt % to 15 wt % based on a total weight of the adhesive formulation. In some embodiments, when the adhesive formulation comprises the at least one second adhesion promoter, the at least one second adhesion promoter is present in an amount ranging from 5 wt % to 15 wt % based on a total weight of the adhesive formulation. In some embodiments, when the adhesive formulation comprises the at least one second adhesion promoter, the at least one second adhesion promoter is present in an amount ranging from 10 wt % to 15 wt % based on a total weight of the adhesive formulation.

In some embodiments, when the adhesive formulation comprises the at least one second adhesion promoter, the at least one second adhesion promoter is present in an amount ranging from 2 wt % to 10 wt % based on a total weight of the adhesive formulation. In some embodiments, when the adhesive formulation comprises the at least one second adhesion promoter, the at least one second adhesion promoter is present in an amount ranging from 2 wt % to 5 wt % based on a total weight of the adhesive formulation. In some embodiments, when the adhesive formulation comprises the at least one second adhesion promoter, the at least one second adhesion promoter is present in an amount ranging from 5 wt % to 10 wt % based on a total weight of the adhesive formulation.

In some embodiments, the adhesive formulation comprises at least one catalyst.

In some embodiments, the at least one catalyst is a plurality of catalysts. In some embodiments, the plurality of catalysts is at least two catalysts. In some embodiments, the plurality of catalysts is at least three catalysts. In some embodiments, the plurality of catalysts is at least four catalysts. In some embodiments, the plurality of catalysts is at least five catalysts. In some embodiments, the plurality of catalysts is at least ten catalysts. In some embodiments, the plurality of catalysts is at least twenty catalysts. In some embodiments, each catalyst of the plurality of catalysts is the same. In some embodiments, each catalyst of the plurality of catalysts is different. In some embodiments, some catalysts of the plurality of catalysts are the same while others are different.

In some embodiments, the at least catalyst is a plurality of catalysts. In some embodiments, the plurality of catalysts is at least two catalysts. In some embodiments, the plurality of catalysts is at least three catalysts. In some embodiments, the plurality of catalysts is at least four catalysts. In some embodiments, the plurality of catalysts is at least five catalysts. In some embodiments, the plurality of catalysts is at least ten catalysts. In some embodiments, the plurality of catalysts is at least twenty catalysts. In some embodiments, each catalyst of the plurality of catalysts is the same. In some embodiments, each catalyst of the plurality of catalysts is different. In some embodiments, some catalysts of the plurality of catalysts are the same while others are different.

In some embodiments, the at least one catalyst comprises at least one first catalyst and at least one second catalyst. The at least one first catalyst and the at least one second catalyst can each be any catalyst described herein. In some embodiments, the at least one first catalyst and the at least one second catalyst are the same. In some embodiments, the at least one first catalyst and the at least one second catalyst are different.

Examples of the at least one catalyst that may be suitable for some embodiments of the present disclosure include, but are not limited to aliphatic primary amines, aliphatic secondary amines, aliphatic tertiary amines, aliphatic unsaturated amines nitrogen-containing heterocyclic compounds (such as but not limited to aliphatic primary amines, aliphatic secondary amines, aliphatic tertiary amines, and aliphatic unsaturated amines), nitrogen-containing heterocyclic compounds, carboxylic acid metal salts, acidic catalysts and basic catalysts.

In some embodiments, the at least one catalyst may comprise consist, or consist essentially of at least one organometallic catalyst.

In some embodiments, the at least organometallic catalyst may comprise or may be selected from the group consisting of least one organotitanium catalyst, at least one organotin catalyst, at least one organoaluminium catalyst, at least one organozirconium catalyst, or any combination thereof.

In some embodiments, the at least one catalyst comprises, consists of, or consists essentially of at least one organotitanium catalyst. Examples of the at least one organotitanium catalyst that may be suitable for some embodiments of the present disclosure include, but are not limited to tetrabutyl titanate, tetrapropyl titanate, titanium tetraacetylacetonate, or any combination thereof.

In some embodiments, the at least one catalyst comprises, consists of, or consists essentially of at least one organoaluminium catalyst. Examples of the at least one organoaluminium catalyst that may be suitable for some embodiments of the present disclosure include, but are limited to, aluminum trisacetylacetonate, aluminum trisethylacetoacetate, diisopropoxyaluminum ethylacetoacetate, or any combination thereof.

In some embodiments, the at least one catalyst comprises, consists of, or consists essentially of at least one organozirconium catalyst. An example of the at least one organozirconium catalyst that may be suitable for some embodiments of the present disclosure includes, but is limited to, zirconium tetraacetylacetonate.

In some embodiments, the at least one catalyst comprises, consists of, or consists essentially of at least one organotin catalyst. In some embodiments, the at least one organotin catalyst comprises or is selected from the group consisting of tin octylate, tin naphthenate, tin stearate, or any combination thereof.

In some embodiments, the at least one organotin catalyst comprises at least one dibutyltin catalyst.

In some embodiments, the at least one dibutyl tin catalyst comprises or is selected from the group consisting of dibutyltin dilaurate, dibutyltin maleate, dibutyltin phthalate, dibutyltin dioctate, dibutyltin diethylhexanolate, dibutyltin dimethylmaleate, dibutyltin diethylmaleate, dibutyltin dibutylmaleate, dibutyl tin dioctylmaleate, dibutyltin ditridecylmaleate, dibutyltin dibenzylmaleate, dioctyltin diethylmaleate, dioctyltin dioctylmaleate, dibutyltin dimethoxide, dibutyltin dinonylphenoxide, dibutenyltin oxide, dibutyltin diacetylacetonate, dibutyltin diethylacetoacetonate, or any combination thereof.

In some embodiments, the at least one dibutyltin catalyst comprises, consists of, or consists essentially of dibutyltin diacetate. A non-limiting example of a commercially available form of dibutyltin diacetate is REAXIS® C233.

In some embodiments, the at least one dibutyltin catalyst comprises dibutyl tin bis (acetylacenoate). A non-limiting example of a commercially available form of dibutyl tin bis (acetylacenoate) is NEOSTANN™ U220. In some embodiments, the at least one dibutyltin catalyst does not comprise dibutyl tin bis (acetylacenoate).

Additional examples of catalysts that may be suitable for some embodiments of the present disclosure include guanidine, at least one guanidine-containing compound, or any combination thereof. Examples of the at least one guanidine containing compound include but are not limited to phenylguanidine diphenylguanidine, butyl biguanide, 1-o-tolyl biguanide, phenyl biguanide, or any combination thereof.

An additional, commercially available example of a guanidine containing compound, is DYHARD® OTB, which is o-tolylbiguanide.

In some embodiments, the adhesive formulation of the present disclosure excludes guanidine. In some embodiments, the adhesive formulation of the present disclosure excludes guanidine-containing compounds. In some embodiments, the adhesive formulation of the present disclosure excludes guanidine and also excludes guanidine-containing compounds.

In some embodiments, the adhesive formulation of the present disclosure includes at most 5% of guanidine. In some embodiments, the adhesive formulation of the present disclosure includes at most 4% of guanidine. In some embodiments, the adhesive formulation of the present disclosure includes at most 3% of guanidine. In some embodiments, the adhesive formulation of the present disclosure includes at most 2% of guanidine. In some embodiments, the adhesive formulation of the present disclosure includes at most 1% of guanidine.

In some embodiments, the adhesive formulation of the present disclosure includes at most 5% of guanidine containing compounds. In some embodiments, the adhesive formulation of the present disclosure includes at most 4% of guanidine containing compounds. In some embodiments, the adhesive formulation of the present disclosure includes at most 3% of guanidine containing compounds. In some embodiments, the adhesive formulation of the present disclosure includes at most 2% of guanidine containing compounds. In some embodiments, the adhesive formulation of the present disclosure includes at most 1% of guanidine containing compounds.

In some embodiments, the at least one catalyst is present in the adhesive formulation in an amount of 0.1 wt % to 5 wt % by weight of the adhesive formulation. In some embodiments, the at least one catalyst is present in the adhesive formulation in an amount of 0.5 wt % to 5 wt % by weight of the adhesive formulation. In some embodiments, the at least one catalyst is present in the adhesive formulation in an amount of 1 wt % to 5 wt % by weight of the adhesive formulation. In some embodiments, the at least one catalyst is present in the adhesive formulation in an amount of 2 wt % to 5 wt % by weight of the adhesive formulation. In some embodiments, the at least one catalyst is present in the adhesive formulation in an amount of 3 wt % to 5 wt % by weight of the adhesive formulation. In some embodiments, the at least one catalyst is present in the adhesive formulation in an amount of 4 wt % to 5 wt % by weight of the adhesive formulation.

In some embodiments, the at least one catalyst is present in the adhesive formulation in an amount of 0.1 wt % to 4 wt % by weight of the adhesive formulation. In some embodiments, the at least one catalyst is present in the adhesive formulation in an amount of 0.1 wt % to 3 wt % by weight of the adhesive formulation. In some embodiments, the at least one catalyst is present in the adhesive formulation in an amount of 0.1 wt % to 2 wt % by weight of the adhesive formulation. In some embodiments, the at least one catalyst is present in the adhesive formulation in an amount of 0.1 wt % to 1 wt % by weight of the adhesive formulation. In some embodiments, the at least one catalyst is present in the adhesive formulation in an amount of 0.1 wt % to 0.5 wt % by weight of the adhesive formulation.

In some embodiments, the at least one catalyst is present in the adhesive formulation in an amount of 0.5 wt % to 4 wt % by weight of the adhesive formulation. In some embodiments, the at least one catalyst is present in the adhesive formulation in an amount of 1 wt % to 3 wt % by weight of the adhesive formulation. In some embodiments, the at least one catalyst is present in the adhesive formulation in an amount of 2 wt % to 3 wt % by weight of the adhesive formulation. In some embodiments, the at least one catalyst is present in the adhesive formulation in an amount of 1 wt % to 3 wt % by weight of the adhesive formulation.

In some embodiments, the at least one catalyst is present in the adhesive formulation in a weight ratio of the at least one catalyst to the at least one high viscosity silyl modified polymer of 1:1000 to 1:10. In some embodiments, the at least one catalyst is present in the adhesive formulation in a weight ratio of the at least one catalyst to the at least one high viscosity silyl modified polymer of 1:100 to 1:10. In some embodiments, the at least one catalyst is present in the adhesive formulation in a weight ratio of the at least one catalyst to the at least one high viscosity silyl modified polymer of 1:50 to 1:10. In some embodiments, the at least one catalyst is present in the adhesive formulation in a weight ratio of the at least one catalyst to the at least one high viscosity silyl modified polymer of 1:40 to 1:10. In some embodiments, the at least one catalyst is present in the adhesive formulation in a weight ratio of the at least one catalyst to the at least one high viscosity silyl modified polymer of 1:30 to 1:10. In some embodiments, the at least one catalyst is present in the adhesive formulation in a weight ratio of the at least one catalyst to the at least one high viscosity silyl modified polymer of 1:20 to 1:10.

In some embodiments, the at least one catalyst is present in the adhesive formulation in a weight ratio of the at least one catalyst to the at least one high viscosity silyl modified polymer of 1:1000 to 1:20. In some embodiments, the at least one catalyst is present in the adhesive formulation in a weight ratio of the at least one catalyst to the at least one high viscosity silyl modified polymer of 1:1000 to 1:30. In some embodiments, the at least one catalyst is present in the adhesive formulation in a weight ratio of the at least one catalyst to the at least one high viscosity silyl modified polymer of 1:1000 to 1:40. In some embodiments, the at least one catalyst is present in the adhesive formulation in a weight ratio of the at least one catalyst to the at least one high viscosity silyl modified polymer of 1:1000 to 1:50. In some embodiments, the at least one catalyst is present in the adhesive formulation in a weight ratio of the at least one catalyst to the at least one high viscosity silyl modified polymer of 1:1000 to 1:100.

In some embodiments, the at least one catalyst is present in the adhesive formulation in a weight ratio of the at least one catalyst to the at least one high viscosity silyl modified polymer of 1:100 to 1:20. In some embodiments, the at least one catalyst is present in the adhesive formulation in a weight ratio of the at least one catalyst to the at least one high viscosity silyl modified polymer of 1:50 to 1:30. In some embodiments, the at least one catalyst is present in the adhesive formulation in a weight ratio of the at least one catalyst to the at least one high viscosity silyl modified polymer of 1:50 to 1:40. In some embodiments, the at least one catalyst is present in the adhesive formulation in a weight ratio of the at least one catalyst to the at least one high viscosity silyl modified polymer of 1:40 to 1:30.

In some embodiments, the adhesive formulation comprises at least one filler. In some embodiments, the at least one filler is a plurality of fillers.

In some embodiments, the at least one filler comprises at least one mineral filler. In some embodiments, the at least one mineral filler comprises calcium carbonate, silica, or any combination thereof. In some embodiments, the silica takes the form of fumed silica, precipitated silica, crystalline silica, quartz, or any combination thereof. In some embodiments, the calcium carbonate takes the form of heavy calcium carbonate, colloidal calcium carbonate, limestone, or any combination thereof.

Other examples of the at least one filler that may be suitable for some embodiments of the present disclosure include, but are not limited to, carbon black, activated carbon, magnesium carbonate, diatomite, bentonite, calcined clay, clay, talc, titanium oxide, glass fibers, microcellulose fibers, polymer fibers, kaolin, polymer microspheres, sand, granules, extended perlite, expanded polystyrene, beads, saw dust, flyash, pulp, polymer grains, polymer flakes, rice hulls, hollow glass microspheres, or any combination thereof.

In some embodiments, the at least one filler is present in the adhesive formulation in an amount ranging from 1% to 60% based on a total weight of the adhesive formulation. In some embodiments, the at least one filler is present in the adhesive formulation in an amount ranging from 10% to 60% based on a total weight of the adhesive formulation. In some embodiments, the at least one filler is present in the adhesive formulation in an amount ranging from 20% to 60% based on a total weight of the adhesive formulation. In some embodiments, the at least one filler is present in the adhesive formulation in an amount ranging from 30% to 60% based on a total weight of the adhesive formulation. In some embodiments, the at least one filler is present in the adhesive formulation in an amount ranging from 40% to 60% based on a total weight of the adhesive formulation. In some embodiments, the at least one filler is present in the adhesive formulation in an amount ranging from 50% to 60% based on a total weight of the adhesive formulation.

In some embodiments, the at least one filler is present in the adhesive formulation in an amount ranging from 1% to 50% based on a total weight of the adhesive formulation. In some embodiments, the at least one filler is present in the adhesive formulation in an amount ranging from 1% to 40% based on a total weight of the adhesive formulation. In some embodiments, the at least one filler is present in the adhesive formulation in an amount ranging from 1% to 30% based on a total weight of the adhesive formulation. In some embodiments, the at least one filler is present in the adhesive formulation in an amount ranging from 1% to 20% based on a total weight of the adhesive formulation. In some embodiments, the at least one filler is present in the adhesive formulation in an amount ranging from 1% to 10% based on a total weight of the adhesive formulation.

In some embodiments, the at least one filler is present in the adhesive formulation in an amount ranging from 10% to 50% based on a total weight of the adhesive formulation. In some embodiments, the at least one filler is present in the adhesive formulation in an amount ranging from 20% to 40% based on a total weight of the adhesive formulation. In some embodiments, the adhesive formulation comprises at least one filler. In some embodiments, the at least one filler is a plurality of fillers.

In some embodiments, the adhesive formulation comprises at least one plasticizer. In some embodiments, the at least one plasticizer is a plurality of plasticizers.

In some embodiments, the at least one plasticizer comprises at least one polyol. In some embodiments, the at least one polyol comprises polypropylene glycol. In some embodiments, the at least one polyol comprises polyethylene glycol. A non-limiting commercial example of at least one polyol plasticizer that may be suitable for some embodiments of the present disclosure is Poly-G® 20-37.

Other examples of the at least one plasticizer that may be suitable for some embodiments of the present disclosure include, but are not limited to dibutyl phthalate, diisononyl phthalate, di(2-ethylhexyl) phthalate, diisodecyl phthalate, at least one unsaturated fatty acid ester compound, at least one alkyl sulfonic acid phenyl esters, at least one hydrocarbon oil, or any combination thereof.

In some embodiments, the at least one plasticizer is present in the adhesive formulation in an amount ranging from 1% to 50% based on a total weight of the adhesive formulation. In some embodiments, the at least one plasticizer is present in the adhesive formulation in an amount ranging from 10% to 50% based on a total weight of the adhesive formulation. In some embodiments, the at least one plasticizer is present in the adhesive formulation in an amount ranging from 20% to 50% based on a total weight of the adhesive formulation. In some embodiments, the at least one plasticizer is present in the adhesive formulation in an amount ranging from 30% to 50% based on a total weight of the adhesive formulation. In some embodiments, the at least one plasticizer is present in the adhesive formulation in an amount ranging from 40% to 50% based on a total weight of the adhesive formulation.

In some embodiments, the at least one plasticizer is present in the adhesive formulation in an amount ranging from 1% to 40% based on a total weight of the adhesive formulation. In some embodiments, the at least one plasticizer is present in the adhesive formulation in an amount ranging from 1% to 30% based on a total weight of the adhesive formulation. In some embodiments, the at least one plasticizer is present in the adhesive formulation in an amount ranging from 1% to 20% based on a total weight of the adhesive formulation. In some embodiments, the at least one plasticizer is present in the adhesive formulation in an amount ranging from 1% to 10% based on a total weight of the adhesive formulation.

In some embodiments, the at least one plasticizer is present in the adhesive formulation in an amount ranging from 10% to 40% based on a total weight of the adhesive formulation. In some embodiments, the at least one plasticizer is present in the adhesive formulation in an amount ranging from 20% to 30% based on a total weight of the adhesive formulation.

In some embodiments, the adhesive formulation comprises at least one antioxidant. In some embodiments, the at least one antioxidant is a plurality of antioxidants.

Non-limiting commercial examples of the at least one antioxidant include, but are not limited to, Irganox® 245, Irganox® 1010, and Irganox® 1076. In some embodiments, the at least one antioxidant comprises pentaerythritol tetrakis (3-(3,5-di-tert-butyl-4-hydroxyphenyl)propionate).

In some embodiments, the at least one antioxidant is present in an amount of 0.1% to 5% based on a total weight of the adhesive formulation. In some embodiments, the at least one antioxidant is present in an amount of 1% to 5% based on a total weight of the adhesive formulation. In some embodiments, the at least one antioxidant is present in an amount of 2% to 5% based on a total weight of the adhesive formulation. In some embodiments, the at least one antioxidant is present in an amount of 3% to 5% based on a total weight of the adhesive formulation. In some embodiments, the at least one antioxidant is present in an amount of 4% to 5% based on a total weight of the adhesive formulation.

In some embodiments, the at least one antioxidant is present in an amount of 0.1% to 4% based on a total weight of the adhesive formulation. In some embodiments, the at least one antioxidant is present in an amount of 0.1% to 3% based on a total weight of the adhesive formulation. In some embodiments, the at least one antioxidant is present in an amount of 0.1% to 2% based on a total weight of the adhesive formulation. In some embodiments, the at least one antioxidant is present in an amount of 0.1% to 1% based on a total weight of the adhesive formulation.

In some embodiments, the at least one antioxidant is present in an amount of 1% to 4% based on a total weight of the adhesive formulation. In some embodiments, the at least one antioxidant is present in an amount of 2% to 3% based on a total weight of the adhesive formulation.

In some embodiments, the adhesive formulation is free or substantially free of asphalt. As used herein, an adhesive formulation is "free of asphalt" when no detectable asphalt is present in the formulation. As used herein, an adhesive formulation is "substantially free of asphalt" when no more than a specific amount of asphalt is present in the formulation. In some embodiments, the specific amount of asphalt is at most 5% of asphalt by weight based on a total weight of the formulation. In some embodiments, the specific amount of asphalt is at most 1% of asphalt by weight based on a total weight of the formulation. In some embodiments, the specific amount of asphalt tis at most 0.5% of asphalt by weight based on a total weight of the formulation. In some embodiments, the specific amount of asphalt is at most 0.05% of asphalt by weight based on a total weight of the formulation. In some embodiments, the specific amount of asphalt is at most 0.005% of asphalt by weight based on a total weight of the formulation.

In some embodiments, the adhesive formulation is free or substantially free of at least one tackifier. As used herein, an adhesive formulation is "free of at least one tackifier" when no detectable amount of at least one tackifier is present in the formulation. As used herein, an adhesive formulation is "substantially free of at least one tackifier" when no more than a specific amount of at least one tackifier is present in the formulation. In some embodiments, the specific amount of at least one tackifier is at most 5% of at least one tackifier by weight based on a total weight of the formulation. In some embodiments, the specific amount of at least one tackifier is at most 1% of at least one tackifier by weight based on a total weight of the formulation. In some embodiments, the specific amount of at least one tackifier is at most 0.5% of at least one tackifier by weight based on a total weight of the formulation. In some embodiments, the specific amount of at least one tackifier is at most 0.05% of at least one tackifier by weight based on a total weight of the formulation. In some embodiments, the specific amount of at least one tackifier is at most 0.005% of at least one tackifier by weight based on a total weight of the formulation.

In some embodiments, the adhesive formulation comprises only one tackifier. In some embodiments, the adhesive formulation comprises no more than two tackifiers. In some embodiments, the adhesive formulation comprises no more than three tackifiers. In some embodiments, the adhesive formulation comprises no more than four tackifiers. In some embodiments, the adhesive formulation comprises no more than five tackifiers. In some embodiments, the adhesive formulation comprises at no more than ten tackifiers.

Non-limiting examples of at least one tackifier include, at least one terpene resin, at least one petroleum resin, at least one hydrogenated rosin, at least one rosin milk, at least one petroleum resin emulsion, at least one terpene-phenolic resin, at least one hydrogenated petroleum resin, at least one aliphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

Non-limiting commercial examples of the at least one tackifier include, but are not-limited to, Sylvatac RE-98, Sylvatac RE-25, or any combination thereof.

In some embodiments, the adhesive formulation exhibits a specific cure time. As used herein, "cure time" is measured at 23° C. and 50% relative humidity using a dry time recorder from Gardco®.

In some embodiments the adhesive formulation exhibits a cure time of 0.5 hours to 30 hours. In some embodiments the adhesive formulation exhibits a cure time of 1 hour to 30 hours. In some embodiments the adhesive formulation exhibits a cure time of 2 hours to 30 hours. In some embodiments the adhesive formulation exhibits a cure time of 3 hours to 30 hours. In some embodiments the adhesive formulation exhibits a cure time of 4 hours to 30 hours. In some embodiments the adhesive formulation exhibits a cure time of 5 hours to 30 hours. In some embodiments the adhesive formulation exhibits a cure time of 6 hours to 30 hours. In some embodiments the adhesive formulation exhibits a cure time of 7 hours to 30 hours. In some embodiments the adhesive formulation exhibits a cure time of 8 hours to 30 hours. In some embodiments the adhesive formulation exhibits a cure time of 9 hours to 30 hours. In some embodiments the adhesive formulation exhibits a cure time of 10 hours to 30 hours. In some embodiments the adhesive formulation exhibits a cure time of 15 hours to 30 hours. In some embodiments the adhesive formulation exhibits a cure time of 20 hours to 30 hours.

In some embodiments the adhesive formulation exhibits a cure time of 0.5 hours to 25 hours. In some embodiments the adhesive formulation exhibits a cure time of 0.5 hours to 15 hours. In some embodiments the adhesive formulation exhibits a cure time of 0.5 hours to 20 hours. In some embodiments, the adhesive formulation exhibits a cure time of 0.5 hours to 15 hours. In some embodiments the adhesive formulation exhibits a cure time of 0.5 hours to 10 hours. In some embodiments, the adhesive formulation exhibits a cure time of 0.5 hours to 9 hours. In some embodiments, the adhesive formulation exhibits a cure time of 0.5 hours to 9 hours. In some embodiments, the adhesive formulation exhibits a cure time of 0.5 hours to 8 hours. In some embodiments, the adhesive formulation exhibits a cure time of 0.5 hours to 9 hours. In some embodiments, the adhesive formulation exhibits a cure time of 0.5 hours to 7 hours. In some embodiments, the adhesive formulation exhibits a cure time of 0.5 hours to 6 hours. In some embodiments, the adhesive formulation exhibits a cure time of 0.5 hours to 5 hours. In some embodiments, the adhesive formulation exhibits a cure time of 0.5 hours to 4 hours. In some embodiments, the adhesive formulation exhibits a cure time of 0.5 hours to 3 hours. In some embodiments, the adhesive formulation exhibits a cure time of 0.5 hours to 2 hours.

In some embodiments, the adhesive formulation exhibits a cure time of 1 hour to 25 hours. In some embodiments, the adhesive formulation exhibits a cure time of 2 hours to 20 hours. In some embodiments, the adhesive formulation exhibits a cure time of 3 hours to 15 hours. In some embodiments, the adhesive formulation exhibits a cure time of 4 hours to 10 hours. In some embodiments, the adhesive formulation exhibits a cure time of 5 hours to 9 hours.

In some embodiments, the adhesive formulation exhibits a cure time of 3 to 6 hours. In some embodiments, the adhesive formulation exhibits a cure time of 4 hours to 6 hours. In some embodiments, the adhesive formulation exhibits a cure time of 5 hours to 6 hours.

In some embodiments, the adhesive formulation exhibits a cure time of 3 hours to 5 hours. In some embodiments, the adhesive formulation exhibits a cure time of 3 hours to 4 hours.

In some embodiments, the adhesive formulation exhibits a cure time of 4 hours to 5 hours.

In some embodiments, the adhesive formulation exhibits a passing grade for shelf life after the formulation is aged for 28 days at 50° C. As used herein, an adhesive formulation exhibits a "passing grade" for shelf life when a test viscosity of the adhesive formulation is within a predetermined percentage of an initial viscosity after the adhesive formulation is aged for 28 days at 50° C. As used herein, "an initial viscosity" is a viscosity of the adhesive formulation measured, prior to aging of the adhesive formulation, at 23° C. using a Brookfield viscometer spindle number 6, at 20 rpm. As used herein, a "test viscosity" is the viscosity of the same adhesive formulation (i.e., for which the initial viscosity was measured) after aging the adhesive formulation for 28 days at 50° C., cooling the adhesive formulation to 23° C., and measuring the viscosity of the adhesive formulation at 23° C. using a Brookfield viscometer spindle number 6, at 20 rpm.

In some embodiments, "cooling the adhesive formulation to 23° C." comprises passively cooling the adhesive formulation—i.e., allowing the adhesive formulation to cool under ambient conditions. In some embodiments, "cooling the adhesive formulation to 23° C." comprises actively cooling the adhesive formulation, e.g., by using any mechanism known in the art, such as but not limited to, at least one fan, refrigeration, at least one vacuum, or any combination thereof.

In some embodiments, the test viscosity of the adhesive formulation is within ±100% of the initial viscosity after the adhesive formulation is aged for 28 days at 50° C. In some embodiments, the test viscosity of the adhesive formulation is within ±90% of the initial viscosity after the adhesive formulation is aged for 28 days at 50° C. In some embodiments, the test viscosity of the adhesive formulation is within ±80% of the initial viscosity after the adhesive formulation is aged for 28 days at 50° C. In some embodiments, the test viscosity of the adhesive formulation is within ±70% of the initial viscosity after the adhesive formulation is aged for 28 days at 50° C. In some embodiments, the test viscosity of the adhesive formulation is within ±60% of the initial viscosity after the adhesive formulation is aged for 28 days at 50° C. In some embodiments, the test viscosity of the adhesive formulation is within ±50% of the initial viscosity after the adhesive formulation is aged for 28 days at 50° C. In some embodiments, the test viscosity of the adhesive formulation is within ±40% of the initial viscosity after the adhesive formulation is aged for 28 days at 50° C. In some embodiments, the test viscosity of the adhesive formulation is within ±30% of the initial viscosity after the adhesive formulation is aged for 28 days at 50° C. In some embodiments, the test viscosity of the adhesive formulation is within ±20% of the initial viscosity after the adhesive formulation is aged for 28 days at 50° C. In some embodiments, the test viscosity of the adhesive formulation is within ±10% of the initial viscosity after the adhesive formulation is aged for 28 days at 50° C.

In some embodiments, the test viscosity of the adhesive formulation is no more than 100% greater than the initial viscosity after the adhesive formulation is aged for 28 days at 50° C. In some embodiments, the test viscosity of the adhesive formulation is no more than 90% greater than the initial viscosity after the adhesive formulation is aged for 28 days at 50° C. In some embodiments, the test viscosity of the adhesive formulation is no more than 80% greater than the initial viscosity after the adhesive formulation is aged for 28 days at 50° C. In some embodiments, the test viscosity of the adhesive formulation is no more than 70% greater than the initial viscosity after the adhesive formulation is aged for 28 days at 50° C. In some embodiments, the test viscosity of the adhesive formulation is no more than 60% greater than the initial viscosity after the adhesive formulation is aged for 28 days at 50° C. In some embodiments, the test viscosity of the adhesive formulation is no more than 70% greater than the initial viscosity after the adhesive formulation is aged for 28 days at 50° C. In some embodiments, the test viscosity of the adhesive formulation is no more than 60% greater than the initial viscosity after the adhesive formulation is aged for 28 days at 50° C. In some embodiments, the test viscosity of the adhesive formulation is no more than 50% greater than the initial viscosity after the adhesive formulation is aged for 28 days at 50° C. In some embodiments, the test viscosity of the adhesive formulation is no more than 40% greater than the initial viscosity after the adhesive formulation is aged for 28 days at 50° C. In some embodiments, the test viscosity of the adhesive formulation is no more than 30% greater than the initial viscosity after the adhesive formulation is aged for 28 days at 50° C. In some embodiments, the test viscosity of the adhesive formulation is no more than 20% greater than the initial viscosity after the adhesive formulation is aged for 28 days at 50° C. In some embodiments, the test viscosity of the adhesive formulation is no more than 10% greater than the initial viscosity after the adhesive formulation is aged for 28 days at 50° C.

In some embodiments, the test viscosity of the adhesive formulation is no less than 90% of the initial viscosity after the adhesive formulation is aged for 28 days at 50° C. In some embodiments, the test viscosity of the adhesive formulation is no less than 80% of the initial viscosity after the adhesive formulation is aged for 28 days at 50° C. In some embodiments, the test viscosity of the adhesive formulation is no less than 70% of the initial viscosity after the adhesive formulation is aged for 28 days at 50° C. In some embodiments, the test viscosity of the adhesive formulation is no less than 60% of the initial viscosity after the adhesive formulation is aged for 28 days at 50° C. In some embodiments, the test viscosity of the adhesive formulation is no less than 50% of the initial viscosity after the adhesive formulation is aged for 28 days at 50° C. In some embodiments, the test viscosity of the adhesive formulation is no less than 40% of the initial viscosity after the adhesive formulation is aged for 28 days at 50° C. In some embodiments, the test viscosity of the adhesive formulation is no less than 30% of the initial viscosity after the adhesive formulation is aged for 28 days at 50° C. In some embodiments, the test viscosity of the adhesive formulation is no less than 20% of the initial viscosity after the adhesive formulation is aged for 28 days at 50° C. In some embodiments, the test viscosity of the adhesive formulation is no less than 10% of the initial viscosity after the adhesive formulation is aged for 28 days at 50° C.

In some embodiments, a sufficient amount of the adhesive formulation, as applied between at least one roofing membrane and at least one roof substrate, and after a sufficient amount of curing, results in a roofing system having a specific wind uplift resistance.

As used herein, wind uplift resistance is measured according to "FM Approvals® method, Procedure Name: 12×24 ft Wind Uplift Tests using Positive Static Pressure, Procedure No: 4450, 4470, 4474, Revision No: 1 Date: Sep. 25, 2008" (hereinafter, "the 12×24 ft Wind Uplift Test") at 23° C. and 50% relative humidity. The 12×24 ft Wind Uplift Test is incorporated herein by reference in its entirety for all purposes.

In some embodiments, a sufficient amount of the adhesive formulation, as applied between at least one roofing membrane and at least one roof substrate, and after a sufficient amount of curing, results in a roofing system having a wind uplift resistance of at least 100 pounds per square foot (psf) measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 105 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 110 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 120 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 125 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 130 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 135 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 140 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 145 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 150 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 155 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 160 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 165 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 170 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 175 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 180 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 185 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 190 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 195 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of at least 200 psf measured according to the 12×24 ft Wind Uplift Test at 23° C. and 50% relative humidity.

In some embodiments, a sufficient amount of the adhesive formulation, as applied between at least one roofing membrane and at least one roof substrate, and after a sufficient amount of curing, results in a roofing system having a wind uplift resistance of 100 psf to 250 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 125 psf to 250 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 150 psf to 250 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 175 psf to 250 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 200 psf to 250 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 225 psf to 250 psf measured according to the 12×24 ft Wind Uplift Test at 23° C. and 50% relative humidity.

In some embodiments, a sufficient amount of the adhesive formulation, as applied between at least one roofing membrane and at least one roof substrate, and after a sufficient amount of curing, results in a roofing system having a wind uplift resistance of 100 psf to 225 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 100 psf to 200 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 100 psf to 175 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 100 psf to 150 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 100 psf to 125 psf measured according to the 12×24 ft Wind Uplift Test at 23° C. and 50% relative humidity.

In some embodiments, a sufficient amount of the adhesive formulation, as applied between at least one roofing membrane and at least one roof substrate, and after a sufficient amount of curing, results in a roofing system having a wind uplift resistance of 125 psf to 225 psf measured according to the 12×24 ft Wind Uplift Test at 23° C. and 50% relative humidity. In some embodiments, a sufficient amount of the adhesive formulation, as applied between at least one roofing membrane and at least one roof substrate, and after a sufficient amount of curing, results in a roofing system having a wind uplift resistance of 150 psf to 200 psf measured according to the 12×24 ft Wind Uplift Test at 23° C. and 50% relative humidity.

In some embodiments, the sufficient amount of the adhesive formulation applied between the at least one roofing membrane and the at least one roof substrate is at least 0.001 gallons of the adhesive formulation per square foot of the at least one roofing membrane. In some embodiments, the sufficient amount of the adhesive formulation applied between the at least one roofing membrane and the at least one roof substrate is at least 0.005 gallons of the adhesive formulation per square foot of the at least one roofing membrane. In some embodiments, the sufficient amount of the adhesive formulation applied between the at least one roofing membrane and the at least one roof substrate is at least 0.01 gallons of the adhesive formulation per square foot of the at least one roofing membrane. In some embodiments, the sufficient amount of the adhesive formulation applied between the at least one roofing membrane and the at least one roof substrate is at least 0.05 gallons of the adhesive formulation per square foot of the at least one roofing membrane. In some embodiments, the sufficient amount of the adhesive formulation applied between the at least one roofing membrane and the at least one roof substrate is at least 0.1 gallons of the adhesive formulation per square foot of the at least one roofing membrane.

In some embodiments, the sufficient amount of the adhesive formulation applied between the at least one roofing membrane and the at least one roof substrate is from 0.001 gallons to 0.1 gallons of the adhesive formulation per square foot of the at least one roofing membrane. In some embodiments, the sufficient amount of the adhesive formulation applied between the at least one roofing membrane and the at least one roof substrate is from 0.005 gallons to 0.1 gallons of the adhesive formulation per square foot of the at least one roofing membrane. In some embodiments, the sufficient amount of the adhesive formulation applied between the at least one roofing membrane and the at least one roof substrate is from 0.01 gallons to 0.1 gallons of the adhesive formulation per square foot of the at least one roofing membrane. In some embodiments, the sufficient amount of the adhesive formulation applied between the at least one roofing membrane and the at least one roof substrate is from 0.05 gallons to 0.1 gallons of the adhesive formulation per square foot of the at least one roofing membrane.

In some embodiments, the sufficient amount of the adhesive formulation applied between the at least one roofing membrane and the at least one roof substrate is from 0.001 gallons to 0.05 gallons of the adhesive formulation per square foot of the at least one roofing membrane. In some embodiments, the sufficient amount of the adhesive formulation applied between the at least one roofing membrane and the at least one roof substrate is from 0.001 gallons to 0.01 gallons of the adhesive formulation per square foot of the at least one roofing membrane. In some embodiments, the sufficient amount of the adhesive formulation applied between the at least one roofing membrane and the at least one roof substrate is from 0.001 gallons to 0.005 gallons of the adhesive formulation per square foot of the at least one roofing membrane.

In some embodiments, the sufficient amount of the adhesive formulation applied between the at least one roofing membrane and the at least one roof substrate is from 0.005 gallons to 0.05 gallons of the adhesive formulation per square foot of the at least one roofing membrane. In some embodiments, the sufficient amount of the adhesive formulation applied between the at least one roofing membrane and the at least one roof substrate is from 0.005 gallons to 0.01 gallons of the adhesive formulation per square foot of the at least one roofing membrane.

Some embodiments of the present disclosure relate to a method comprising applying the adhesive formulation described herein to at least one roofing membrane and bonding the at least one roofing membrane to at least one roof substrate using the adhesive formulation described herein.

In some embodiments, the method comprises applying the adhesive formulation described herein to a plurality of roofing membranes and bonding the plurality of roofing membranes to at least one roof substrate using the adhesive formulation described herein. In some embodiments, the method comprises applying the adhesive formulation described herein to at least one roofing membrane and bonding the at least one roofing membrane to a plurality of roof substrates using the adhesive formulation described herein. In some embodiments, the method comprises applying the adhesive formulation described herein to a plurality of roofing membranes and bonding the plurality of roofing membranes to a plurality of roof substrates using the adhesive formulation described herein.

In some non-limiting embodiments, the at least one roofing membrane comprises at least one polyvinyl chloride (PVC) roofing membrane, at least one thermoplastic polyolefin (TPO) roofing membrane, at least one ethylene propylene diene monomer (EPDM) roofing membrane, or any combination thereof.

In some embodiments, the at least one roofing membrane comprises at least one cyclopiazonic acid membrane, at least one chlorinated polyethylene resin membrane, at least one ethylene interpolymer membrane, at least one nitrile butadiene polymer membrane, at least one polyisobutylene membrane, at least one atactic-polypropylene membrane, at least one modified bitumen membrane, at least one poly(styrene-butadiene-styrene) membrane, at least one styrene ethylene butylene styrene membrane, ethylene propylene diene monomer membrane, at least one chlorosulfonated polyethylene rubber membrane, at least one polychloroprene membrane, at least one extracellular region membrane, at least one polycarbonate membrane, at least one nylon membrane, at least one polyvinyl acetate membrane, at least one polystyrene membrane, at least one polytetrafluoroethylene membrane, at least one polyvinylidene fluoride membrane, at least one polyurethane membrane, at least one epoxy membrane, or any combination thereof.

Commercial examples of the at least one roofing membrane include, but are not-limited to, Carlisle Sure-Seal® EPDM, Carlisle Sure-White® EPDM, Johns Manville EPDM NR/R, Firestone RubberGard™ EPDM, Firestone Ecowhite™ EPDM, Fullforce™ EPDM, Carlisle Sure-Flex® PVC, Carlisle Sure-Flex® KEE HP, Johns Manville PVC SD Plus, Johns Manville PVC with KEE, Sika Sarnafil PVC, Firestone UltraPly™ TPO, Firestone UltraPly™ TPO XR, Firestone UltraPly™ TPO Flex Adhered, Firestone Platinum TPO, Carlisle Sure-Weld TPO, or any combination thereof.

Additional commercial examples of the at least one roofing membrane include, but are not-limited to, GAF EverGuard® PVC, GAF EverGuard® PVC XK, GAF EverGuard® TPO, GAF EverGuard Extreme® TPO, GAF EverGuard® TPO Ultra, or any combination thereof.

In some embodiments, the at least one roofing membrane comprises at least one untreated roofing membrane. As used herein, an "untreated" roofing membrane is a roofing membrane that is not subjected to plasma treatment.

In some embodiments, the at least one untreated roofing membrane comprises a smooth-backed surface. In some embodiments the method further comprises applying the adhesive formulation at least to the smooth-backed surface of the at least one untreated roofing membrane.

In some embodiments, a smooth backed surface of at least one untreated roofing membrane may be characterized as having a specific combined total of carbonyl and carboxyl groups as measured by X-ray photoelectron spectroscopy. Non-limiting examples of the at least one untreated roofing membrane and the corresponding combined total of carbonyl and carboxyl groups are described in US Patent Application Publication No. 2020/0095768, which is incorporated herein by reference in its entirety for all purposes.

In some embodiments, a smooth backed surface of an untreated roofing membrane comprises a combined total of carbonyl and carboxyl groups that is less than 3.5 mol % as measured by X-ray photoelectron spectroscopy. In some embodiments, a smooth backed surface of an untreated roofing membrane comprises a combined total of carbonyl and carboxyl groups that is less than 3 mol % as measured by X-ray photoelectron spectroscopy. In some embodiments, a smooth backed surface of an untreated roofing membrane comprises a combined total of carbonyl and carboxyl groups that is less than 2.5 mol % as measured by X-ray photoelectron spectroscopy. In some embodiments, a smooth backed surface of an untreated roofing membrane comprises a combined total of carbonyl and carboxyl groups that is less than 2 mol % as measured by X-ray photoelectron spectroscopy. In some embodiments, a smooth backed surface of an untreated roofing membrane comprises a combined total of carbonyl and carboxyl groups that is less than 1.5 mol % as measured by X-ray photoelectron spectroscopy. In some embodiments, a smooth backed surface of an untreated roofing membrane comprises a combined total of carbonyl and carboxyl groups that is less than 1 mol % as measured by X-ray photoelectron spectroscopy. In some embodiments, a smooth backed surface of an untreated roofing membrane comprises a combined total of carbonyl and carboxyl groups that is less than 0.5 mol % as measured by X-ray photoelectron spectroscopy.

In some embodiments, the smooth backed surface of the untreated roofing membrane is a surface that comprises a combined total of carbonyl and carboxyl groups in an amount of 1 mol % to 3 mol % as measured by X-ray photoelectron spectroscopy. In some embodiments, the smooth backed surface of the untreated roofing membrane is a surface that comprises a combined total of carbonyl and carboxyl groups in an amount of 1.5 mol % to 3 mol % as measured by X-ray photoelectron spectroscopy. In some embodiments, the smooth backed surface of the untreated roofing membrane is a surface that comprises a combined total of carbonyl and carboxyl groups in an amount of 2 mol % to 3 mol % as measured by X-ray photoelectron spectroscopy. In some embodiments, the smooth backed surface of the untreated roofing membrane is a surface that comprises a combined total of carbonyl and carboxyl groups in an amount of 2.5 mol % to 3 mol % as measured by X-ray photoelectron spectroscopy.

In some embodiments, the smooth backed surface of the untreated roofing membrane is a surface that comprises a combined total of carbonyl and carboxyl groups in an amount of 1 mol % to 2.5 mol % as measured by X-ray photoelectron spectroscopy. In some embodiments, the smooth backed surface of the untreated roofing membrane is a surface that comprises a combined total of carbonyl and carboxyl groups in an amount of 1 mol % to 2 mol % as measured by X-ray photoelectron spectroscopy. In some embodiments, the smooth backed surface of the untreated roofing membrane is a surface that comprises a combined total of carbonyl and carboxyl groups in an amount of 1 mol % to 1.5 mol % as measured by X-ray photoelectron spectroscopy.

In some embodiments, the smooth backed surface of the untreated roofing membrane is a surface that comprises a combined total of carbonyl and carboxyl groups in an amount of 1.5 mol % to 2.5 mol % as measured by X-ray photoelectron spectroscopy.

In some embodiments, the at least one roofing membrane comprises at least one treated roofing membrane. As used herein a "treated" roofing membrane is a membrane that is subjected to at least one plasma treatment process.

In some embodiments, the method further comprises subjecting at least one roofing membrane to the at least one plasma treatment process, so as to result in the treated roofing membrane.

In some embodiments, the at least one plasma treatment process comprises blown-arc plasma treatment, atmospheric plasma treatment, blown ion plasma treatment, or corona plasma treatment, or any combination thereof. Additional examples of the at least one plasma treatment process described herein can be found in US Patent Application Publication No. 2020/0095768, which, as mentioned above, is incorporated herein by reference in its entirety for all purposes.

In some embodiments, at least one treated roofing membrane may be characterized as having a specific combined total of carbonyl and carboxyl groups as measured by X-ray photoelectron spectroscopy.

In some embodiments, at least one surface of the at least one treated roofing membrane may comprise a combined total of carbonyl and carboxyl groups in an amount of 3.5 mol % to 10 mol % as measured by X-ray photoelectron spectroscopy. In some embodiments, at least one surface of the at least one treated roofing membrane may comprise a combined total of carbonyl and carboxyl groups in an amount of 4 mol % to 10 mol % as measured by X-ray photoelectron spectroscopy. In some embodiments, at least one surface of the at least one treated roofing membrane may comprise a combined total of carbonyl and carboxyl groups in an amount of 4.5 mol % to 10 mol % as measured by X-ray photoelectron spectroscopy. In some embodiments, at least one surface of the at least one treated roofing membrane may comprise a combined total of carbonyl and carboxyl groups in an amount of 5 mol % to 10 mol % as measured by X-ray photoelectron spectroscopy. In some embodiments, at least one surface of the at least one treated roofing membrane may comprise a combined total of carbonyl and carboxyl groups in an amount of 5.5 mol % to 10 mol % as measured by X-ray photoelectron spectroscopy. In some embodiments, at least one surface of the at least one treated roofing membrane may comprise a combined total of carbonyl and carboxyl groups in an amount of 6 mol % to 10 mol % as measured by X-ray photoelectron spectroscopy. In some embodiments, at least one surface of the at least one treated roofing membrane may comprise a combined total of carbonyl and carboxyl groups in an amount of 6.5 mol % to 10 mol % as measured by X-ray photoelectron spectroscopy. In some embodiments, at least one surface of the at least one treated roofing membrane may comprise a combined total of carbonyl and carboxyl groups in an amount of 7 mol % to 10 mol % as measured by X-ray photoelectron spectroscopy. In some embodiments, at least one surface of the at least one treated roofing membrane may comprise a combined total of carbonyl and carboxyl groups in an amount of 7.5 mol % to 10 mol % as measured by X-ray photoelectron spectroscopy. In some embodiments, at least one surface of the at least one treated roofing membrane may comprise a combined total of carbonyl and carboxyl groups in an amount of 8 mol % to 10 mol % as measured by X-ray photoelectron spectroscopy. In some embodiments, at least one surface of the at least one treated roofing membrane may comprise a combined total of carbonyl and carboxyl groups in an amount of 8.5 mol % to 10 mol % as measured by X-ray photoelectron spectroscopy. In some embodiments, at least one surface of the at least one treated roofing membrane may comprise a combined total of carbonyl and carboxyl groups in an amount of 9 mol % to 10 mol % as measured by X-ray photoelectron spectroscopy. In some embodiments, at least one surface of the at least one treated roofing membrane may comprise a combined total of carbonyl and carboxyl groups in an amount of 9.5 mol % to 10 mol % as measured by X-ray photoelectron spectroscopy.

In some embodiments, at least one surface of the at least one treated roofing membrane may comprise a combined total of carbonyl and carboxyl groups in an amount of 3.5 mol % to 9.5 mol % as measured by X-ray photoelectron spectroscopy. In some embodiments, at least one surface of the at least one treated roofing membrane may comprise a combined total of carbonyl and carboxyl groups in an amount of 3.5 mol % to 9 mol % as measured by X-ray photoelectron spectroscopy. In some embodiments, at least one surface of the at least one treated roofing membrane may comprise a combined total of carbonyl and carboxyl groups in an amount of 3.5 mol % to 8.5 mol % as measured by X-ray photoelectron spectroscopy. In some embodiments, at least one surface of the at least one treated roofing membrane may comprise a combined total of carbonyl and carboxyl groups in an amount of 3.5 mol % to 8 mol % as measured by X-ray photoelectron spectroscopy. In some embodiments, at least one surface of the at least one treated roofing membrane may comprise a combined total of carbonyl and carboxyl groups in an amount of 3.5 mol % to 7 mol % as measured by X-ray photoelectron spectroscopy. In some embodiments, at least one surface of the at least one treated roofing membrane may comprise a combined total of carbonyl and carboxyl groups in an amount of 3.5 mol % to 6.5 mol % as measured by X-ray photoelectron spectroscopy. In some embodiments, at least one surface of the at least one treated roofing membrane may comprise a combined total of carbonyl and carboxyl groups in an amount of 3.5 mol % to 6 mol % as measured by X-ray photoelectron spectroscopy. In some embodiments, at least one surface of the at least one treated roofing membrane may comprise a combined total of carbonyl and carboxyl groups in an amount of 3.5 mol % to 5.5 mol % as measured by X-ray photoelectron spectroscopy. In some embodiments, at least one surface of the at least one treated roofing membrane may comprise a combined total of carbonyl and carboxyl groups in an amount of 3.5 mol % to 5 mol % as measured by X-ray photoelectron spectroscopy. In some embodiments, at least one surface of the at least one treated roofing membrane may comprise a combined total of carbonyl and carboxyl groups in an amount of 3.5 mol % to 4.5 mol % as measured by X-ray photoelectron spectroscopy. In some embodiments, at least one surface of the at least one treated roofing membrane may comprise a combined total of carbonyl and carboxyl groups in an amount of 3.5 mol % to 4 mol % as measured by X-ray photoelectron spectroscopy.

In some embodiments, at least one surface of the at least one treated roofing membrane may comprise a combined total of carbonyl and carboxyl groups in an amount of 4 mol % to 9.5 mol % as measured by X-ray photoelectron spectroscopy. In some embodiments, at least one surface of the at least one treated roofing membrane may comprise a combined total of carbonyl and carboxyl groups in an amount of 4.5 mol % to 9 mol % as measured by X-ray photoelectron spectroscopy. In some embodiments, at least one surface of the at least one treated roofing membrane may comprise a combined total of carbonyl and carboxyl groups in an amount of 5 mol % to 8.5 mol % as measured by X-ray photoelectron spectroscopy. In some embodiments, at least one surface of the at least one treated roofing membrane may comprise a combined total of carbonyl and carboxyl groups in an amount of 5.5 mol % to 8 mol % as measured by X-ray photoelectron spectroscopy. In some embodiments, at least one surface of the at least one treated roofing membrane may comprise a combined total of carbonyl and carboxyl groups in an amount of 6 mol % to 7.5 mol % as measured by X-ray photoelectron spectroscopy. In some embodiments, at least one surface of the at least one treated roofing membrane may comprise a combined total of carbonyl and carboxyl groups in an amount of 6.5 mol % to 7 mol % as measured by X-ray photoelectron spectroscopy.

In some embodiments, the at least one treated roofing membrane comprises a rough-backed surface. In some embodiments, a rough backed surface of at least one untreated roofing membrane may be characterized as having a specific average roughness ($R_a$) as measured using stylus profilometry.

In some embodiments, the rough-backed surface has an average roughness ($R_a$) of 12-40 microns as measured using stylus profilometry. In some embodiments, the rough-backed surface has an average roughness ($R_a$) of 20-40 microns as measured using stylus profilometry. In some embodiments, the rough-backed surface has an average roughness ($R_a$) of 30-40 microns as measured using stylus profilometry. In some embodiments, the rough-backed surface has an average roughness ($R_a$) of 35-40 microns as measured using stylus profilometry.

In some embodiments, the rough-backed surface has an average roughness ($R_a$) of 12-35 microns as measured using stylus profilometry. In some embodiments, the rough-backed surface has an average roughness ($R_a$) of 12-30 microns as measured using stylus profilometry. In some embodiments, the rough-backed surface has an average roughness ($R_a$) of 12-20 microns as measured using stylus profilometry.

In some embodiments, the rough-backed surface has an average roughness ($R_a$) of 20-30 microns as measured using stylus profilometry.

In some embodiments, plasma treatment may not result in formation of a rough backed surface. In some of such embodiments a "treated" membrane may comprise a smooth-backed surface as described herein. In some of such embodiments the smooth-backed surface of the "treated" membrane may comprise any value or range of values for the combined total of carbonyl and carboxyl groups herein.

In some embodiments, the at least one roof substrate may include, but is not limited to, a plywood roof substrate, a glass roof substrate, a cellulosic roof substrate, a roofing shingle, a glass mat, a fiberglass mat, an underlayment, a roof deck, a photovoltaic (PV) panel, a modified bitumen (MODBIT) substrate, a roll good, a chimney, a polyisocyanurate (ISO) foam board, or any combination thereof.

In some embodiments, the step of applying the adhesive formulation described herein to at least one roofing membrane comprises applying the adhesive formulation to the at least one roofing membrane in a sufficient amount (which may be expressed, e.g., in gallons of the applied adhesive formulation per square foot of the at least one roofing membrane) as described herein, infra.

In some embodiments, the step of bonding the at least one roofing membrane to at least one roof substrate comprises curing the adhesive formulation a specified amount of time, such as, but not limited to any range for cure time described herein, infra.

In some embodiments, after the step of bonding the at least one roofing membrane to at least one roof substrate, the method results in the formation of a roofing system that exhibits a value or range of values for wind uplift resistance that is described herein, infra.

In some embodiments the method comprises aging the roofing system for a predetermined amount of time at 23° C. and 95% relative humidity prior to testing the roofing system for wind uplift resistance. In some embodiments, the predetermined amount of time is at least one 1 day. In some embodiments, the predetermined amount of time is at least 7 days. In some embodiments, the predetermined amount of time is at least 28 days. In some embodiments, the predetermined amount of time is at least 56 days. In some embodiments, the predetermined amount of time is at least 70 days. In some embodiments, the predetermined amount of time is at least 350 days. In some embodiments, the predetermined amount of time is at least 70 days. In some embodiments, the predetermined amount of time is at least 700 days.

In some embodiments, the predetermined amount of time is 1 day to 700 days. In some embodiments, the predetermined amount of time is 1 day to 350 days. In some embodiments, the predetermined amount of time is 1 day to 70 days. In some embodiments, the predetermined amount of time is 1 day to 56 days. In some embodiments, the predetermined amount of time is 1 day to 28 days. In some embodiments, the predetermined amount of time is 1 day to 7 days.

In some embodiments, the predetermined amount of time is 7 days to 700 days. In some embodiments, the predetermined amount of time is 28 days to 700 days. In some embodiments, the predetermined amount of time is 56 days to 700 days. In some embodiments, the predetermined amount of time is 70 days to 700 days. In some embodiments, the predetermined amount of time is 350 days to 700 days.

In some embodiments, the predetermined amount of time is 7 days to 350 days. In some embodiments, the predetermined amount of time is 28 days to 70 days. In some embodiments, the predetermined amount of time is 35 days to 56 days.

In some embodiments the method comprises applying the adhesive formulation described herein in stages. In some embodiments the method comprises applying the adhesive formulation described herein in one stage. In some embodiments the method comprises applying the adhesive formulation described herein in two stages. In some embodiments the method comprises applying the adhesive formulation described herein in three stages. In some embodiments the method comprises applying the adhesive formulation described herein in four stages. In some embodiments the method comprises applying the adhesive formulation described herein in five stages. In some embodiments the method comprises applying the adhesive formulation described herein in six stages. In some embodiments the method comprises applying the adhesive formulation described herein in seven stages. In some embodiments the method comprises applying the adhesive formulation described herein in eight stages. In some embodiments the method comprises applying the adhesive formulation described herein in nine stages. In some embodiments the method comprises applying the adhesive formulation described herein in ten stages.

Some embodiments of the present disclosure relate to a roofing system. In some embodiments, the roofing system comprises at least one roofing membrane, at least one roof substrate and the adhesive formulation described herein. In some embodiments, the adhesive formulation is disposed between the at least one roofing membrane and the at least one roof substrate.

In some embodiments, the system comprises the adhesive formulation described herein disposed between at least one roofing membrane and a plurality of roof substrates. In some embodiments, the system comprises the adhesive formulation described herein disposed between a plurality of roofing membranes and at least one roof substrate. In some embodiments, the system comprises the adhesive formulation described herein disposed between a plurality of roofing membranes and a plurality of roof substrates.

In some embodiments, the roofing system that exhibits a value or range of values for wind uplift resistance that is described herein, infra.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

In some embodiments, a claim directed to an adhesive formulation (or a claim directed to a method or system that comprises the adhesive formulation) reciting the term "consisting essentially of" may include any component that is not recited by the claim so long as the addition of the unrecited component does not alter the viscosity of the adhesive formulation to a range or value outside of what is recited by the specific claim. In some embodiments, a claim directed to an adhesive formulation (or a claim directed to a method or system that comprises the adhesive formulation) reciting the term "consisting essentially of" may include any component that is not recited by the claim so long as the addition of the unrecited component does not alter the shelf life of the adhesive formulation to a range or value outside of what is recited by the specific claim. In some embodiments, a claim directed to an adhesive formulation (or a claim directed to a method or system that comprises the adhesive formulation) reciting the term "consisting essentially of" may include any component that is not recited by the claim so long as the addition of the unrecited component does not alter the cure time of the adhesive formulation to a range or value outside of what is recited by the specific claim. In some embodiments, a claim directed to an adhesive formulation (or a claim directed to a method or system that comprises the adhesive formulation) reciting the term "consisting essentially of" may include any component that is not recited by the claim so long as the addition of the unrecited component does not alter the wind uplift resistance imparted by adhesive formulation to a range or value outside of what is recited by the specific claim. In some embodiments, a claim directed to an adhesive formulation (or a claim directed to a method or system that comprises the adhesive formulation) reciting the term "consisting essentially of" may include any component that is not recited by the claim so long as the addition of the unrecited component does not alter any combination of viscosity, shelf life, cure time, or wind uplift resistance recited by the specific claim.

As used herein, when a "consisting essentially of" claim recites the term "optionally," this means that the "optional" component can be either excluded or included without materially affecting the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties. Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

EXAMPLES

Example 1: Exemplary adhesive formulations were prepared. The non-limiting exemplary adhesive formulations comprised at least one high viscosity silyl modified polymer.

The amounts of each component of the exemplary formulations—i.e., Formulations 1-5—are shown below in Tables 1A and 1B respectively. As shown, the amount of each component was calculated as a weight ratio of each respective component to the total weight of the at least one high viscosity silyl modified polymer.

As described herein, infra, when a given formulation included more than one high viscosity silyl modified polymer, the weight ratio was calculated based on a total weight of the high viscosity silyl modified polymers in the formulation (i.e., by summing the weights of each high viscosity silyl modified polymer in a given formulation and taking the resulting value as the denominator of the ratio).

TABLE 1A

| Component | Exemplary Commercial Name | Example Formulation 1 (Weight Component:Total Weight High Viscosity Silyl Modified Polymer(s)) | Example Formulation 2 (Weight Component:Total Weight High Viscosity Silyl Modified Polymer(s)) |
| --- | --- | --- | --- |
| High Viscosity Silyl Modified Polymer(s) | GENIOSIL ® STP-E35 | 1:1 | — |
| | KANEKA MS POLYMER ® S227, KANEKA MS POLYMER ® S327, or combination thereof | — | 1:1 |
| Moisture Scavenger | GENIOSIL ® XL 10 | 1:10 | 1:8 |
| Adhesion Promoter | GENIOSIL ® GF 96 | 1:10 | 1:8 |
| Catalyst | REAXIS ® C233 | 1:90 | 1:50 |
| Sum of Additional Components (e.g., Plasticizer(s), Filler(s), Antioxidant(s)). | — | 7:2 | 7:2 |

TABLE 1B

| Component | Exemplary Commercial Name | Example Formulation 3 (Weight Component:Total Weight High Viscosity Silyl Modified Polymer(s)) | Example Formulation 4 (Weight Component:Total Weight High Viscosity Silyl Modified Polymer(s)) | Example Formulation 5 (Weight Component:Total Weight High Viscosity Silyl Modified Polymer(s)) |
| --- | --- | --- | --- | --- |
| High Viscosity Silyl Modified Polymer(s) | KANEKA MS POLYMER ® S227, KANEKA MS POLYMER ® S327, or combination thereof | 1:1 | 1:1 | 1:1 |
| Moisture Scavenger | GENIOSIL ® XL 10 | 1:10 | 1:10 | 1:10 |
| Adhesion Promoter 1 | GENIOSIL ® GF 96 | 1:10 | 1:10 | 1:10 |
| Adhesion Promoter 2 | AdvaBond ® 8203 | 28:100 | 1:4 | 1:4 |
| Catalyst | REAXIS ® C233 | 25:1000 | 1:55 | 1:22 |
| Sum of Additional Components (e.g., Plasticizer(s), Filler(s), Antioxidant(s)). | — | 3:1 | 3:1 | 3:1 |

Comparative Example 1

The following comparative adhesive formulations were prepared. The comparative adhesive formulations comprised at least some the components shown in Tables 1A and 1B above, but also comprised at least one low viscosity silyl modified polymer.

The specific comparative adhesive formulations are shown below in Table 2. Similar to Example 1, the amount of each component in Table 2 below is expressed as the amount of each component (including the low viscosity silyl modified polymer) was calculated as a weight ratio of the respective component to the total weight of the at least one high viscosity silyl modified polymer.

TABLE 2

| Component | Exemplary Commercial Name | Comparative Formulation 1 (Weight Component:Total Weight High Viscosity Silyl Modified Polymer(s)) | Comparative Formulation 2 (Weight Component:Total Weight High Viscosity Silyl Modified Polymer(s)) |
|---|---|---|---|
| High Viscosity Silyl Modified Polymer(s) | KANEKA MS POLYMER ® S227, KANEKA MS POLYMER ® S327, or combination thereof | 1:1 | 1:1 |
| Low Viscosity Silyl Modified Polymer | KANEKA MS POLYMER ® S203H | 2:1 | 23:10 |
| Moisture Scavenger | GENIOSIL ® XL 10 | 3:8 | 3:10 |
| Adhesion Promoter 1 | GENIOSIL ® GF 96 | 3:10 | 3:10 |
| Adhesion Promoter 2 | AdvaBond ® 8203 | 7:10 | 9:10 |
| Catalyst | REAXIS ® C233 | 9:100 | 8:100 |
| Sum of Additional Components (e.g., Plasticizer(s), Filler(s), Antioxidant(s)). | — | 11:1 | 10:1 |

Example 2

Initial viscosities of the adhesive formulations from Example 1 were measured, as described herein, at 23° C. using a Brookfield viscometer spindle number 6, at 20 rpm. Results of the initial viscosity measurements under these conditions are shown in Table 3 below.

Adhesive formulations 1 to 5 from Example 1 were then aged for 28 days at 50° C. to determine shelf life using the procedure described herein, infra. In the present specific non-limiting example, an adhesive formulation was determined to "pass" shelf life when a measured test viscosity of the adhesive formulation (i.e., after aging for 28 days at 50° C.) was within ±40% of the measured initial viscosity. An indication of whether each adhesive formulation passed the shelf life test described herein, is shown below in Table 3.

TABLE 3

| Formulation | Initial Viscosity (cP) (measured using a Brookfield viscometer spindle number 6, at 20 rpm and at 23° C.) | Shelf Life |
|---|---|---|
| 1 | 13,500 | Pass |
| 2 | 15,000 | Pass |
| 3 | 8,500 | Pass |
| 4 | 11,000 | Pass |
| 5 | 14,000 | Pass |

Example 3

Adhesive formulations 1 to 5 were applied in a sufficient amount to form a bond between an exemplary roofing membrane and an exemplary roof substrate. As described herein, the sufficient amount of the adhesive formulation applied to the roofing membrane was, in the present non-limiting example, expressed as a ratio of the amount of the adhesive formulation applied to the roofing membrane in gallons to the square footage of the roofing membrane.

The resulting exemplary roofing systems were tested for cure time and wind uplift resistance.

Cure time was measured, as described herein, at 23° C. and 50% relative humidity using a dry time recorder from Gardco®.

The exemplary roofing systems were aged for 28 days. Wind uplift resistance of the resulting aged exemplary roof systems was then evaluated using the 12×24 ft Wind Uplift Test described herein, infra, at 23° C. and 50% relative humidity.

As described herein, infra, in the present example, an exemplary roofing membrane that is designated as "untreated" was not subjected to plasma treatment, whereas a "treated" roofing membrane was subjected to plasma treatment before application of the adhesive formulation and bonding of the adhesive formulation to the roof substrate.

In the present non-limiting example, the tested roofing membranes were thermoplastic polyolefin (TPO) roofing membranes.

Results are shown below in Table 4.

TABLE 4

| Formulation | Roofing Membrane Type | Gallons of Adhesive Formulation Per Square Foot of Roofing Membrane | Cure Time | Wind Uplift Resistance (Psf) |
|---|---|---|---|---|
| 1 | Treated TPO | 0.008 | 4-6 hours | 180 |
| 2 | Untreated TPO | 0.003 | 4-6 hours | 150 |
| 3 | Untreated TPO | 0.004 | 4-6 hours | 105 |
| 4 | Untreated TPO | 0.004 | 4-6 hours | 105 |
| 5 | Untreated TPO | 0.004 | 4-6 hours | 150 |

Comparative Example 3

The procedure for evaluating wind uplift resistance from Example 3 was replicated for comparative adhesive formulations 1 and 2. Results are shown below in Table 5.

TABLE 5

| Comparative Formulation | Roofing Membrane Type | Gallons of Adhesive Formulation Per Square Foot of Roofing Membrane | Wind Uplift Resistance (Psf) |
|---|---|---|---|
| 1 | Untreated TPO | 0.004 | 90 |
| 2 | Untreated TPO | 0.004 | 60 |

Example 4

Adhesive Formulation 1 from Example 1 was applied in a sufficient amount so as to form a bond between an exemplary roofing membrane and an exemplary roof substrate, thereby forming an exemplary roofing system. As described herein, the sufficient amount of the adhesive formulation applied to the roofing membrane was, in the present non-limiting example, expressed as a ratio of the amount of the adhesive formulation applied to the roofing membrane in gallons to the square footage of the roofing membrane.

In the present non-limiting example, the exemplary roof substrate was a polyisocyanurate (ISO) foam board. In the present non-limiting example, the exemplary roofing membrane was a polyvinyl chloride (PVC) roofing membrane. In particular, two specific samples of the PVC roofing membrane were tested—a sample PVC membrane with a liquid plasticizer (PVC-LP) and a sample PVC membrane with a ketone ethylene ester plasticizer (PVC-KEE).

Cure time and wind uplift were evaluated using the same procedure and under the same conditions (such as but not limited to temperature, relative humidity, and aging time) as Example 3 and Comparative Example 3.

Results are shown below in Table 6.

TABLE 6

| Formulation | Roofing Membrane Type | Gallons of Adhesive Formulation Per Square Foot of Roofing Membrane | Cure Time | Wind Uplift Resistance (Psf) |
|---|---|---|---|---|
| 1 | PVC-LP | 0.008 | 6 hours | 180 |
| 1 | PVC-KEE | 0.008 | 6 hours | 180 |

What is claimed is:

1. A roofing system comprising:
a roof substrate;
a roofing membrane; and
an adhesive formulation between the roof substrate and the roofing membrane,
wherein the adhesive formulation comprises;
a high viscosity silyl modified polymer having a viscosity of 20,000 cP or higher as measured according to ASTM D2196 using a Brookfield viscometer spindle number 6, at 20 rpm and 23° C.; and
a moisture scavenger,
wherein a weight ratio of the moisture scavenger to the high viscosity silyl modified polymer is 1:20 to 1:2;
wherein, when aged for 28 days at 50° C., the adhesive formulation has a test viscosity, as measured using a Brookfield viscometer spindle number 6 at 20 rpm and at 23° C., that is within +40% of the initial viscosity.

2. The roofing system of claim 1, wherein the roof substrate comprises at least one of a plywood roof substrate, a glass roof substrate, a cellulosic roof substrate, a roofing shingle, a glass mat, a fiberglass mat, an underlayment, a roof deck, a photovoltaic (PV) panel, a modified bitumen (MODBIT) substrate, a roll good, a chimney, a polyisocyanurate (ISO) foam board, or any combination thereof.

3. The roofing system of claim 1, wherein the roofing membrane is a treated roofing membrane having at least one surface subjected to a plasma treatment process.

4. The roofing system of claim 3, wherein the treated roofing membrane comprises a surface having a combined total of carbonyl and carboxyl groups of 3.5 mol % to 10 mol % as measured by X-ray photoelectron spectroscopy.

5. The roofing system of claim 3, wherein the treated roofing membrane comprises a rough backed surface having an average roughness of 12 to 40 microns as measured using stylus profilometry.

6. The roofing system of claim 5, wherein the roofing membrane comprises at least one of a thermoplastic polyolefin (TPO), a polyvinyl chloride (PVC), an ethylene propylene diene monomer (EPDM), or any combination thereof.

7. The roofing system of claim 1, wherein the roofing membrane is an untreated roofing membrane.

8. The roofing system of claim 7, wherein the untreated roofing membrane comprises a smooth backed surface having a combined total of carbonyl and carboxyl groups of 1 mol % to 3 mol % as measured by X-ray photoelectron spectroscopy.

9. The roofing system of claim 7, wherein the roofing membrane comprises at least one of a thermoplastic polyolefin (TPO), a polyvinyl chloride (PVC), an ethylene propylene diene monomer (EPDM), or any combination thereof.

10. The roofing system of claim 1, wherein the roofing membrane further comprises at least one of a cyclopiazonic acid, a chlorinated polyethylene resin, an ethylene interpolymer, a nitrile butadiene polymer, a polyisobutylene, an atactic polypropylene, a modified bitumen, a poly(styrene-butadiene-styrene), a styrene ethylene butylene styrene, an ethylene propylene diene monomer, a chlorosulfonated polyethylene rubber, a polychloroprene, a polycarbonate, a nylon, a polyvinyl acetate, a polystyrene, a polytetrafluoroethylene, a polyvinylidene fluoride, a polyurethane, an epoxy, or any combination thereof.

11. The roofing system of claim 1, wherein the roofing system has a wind uplift resistance of 100 to 250 pounds per square foot (psf) measured according to the 12×24 ft Wind Uplift Test at 23° C. and 50% relative humidity.

12. A roofing system comprising:
a roof substrate;
a roofing membrane,
wherein the roofing membrane comprises at least one of a thermoplastic polyolefin (TPO), a polyvinyl chloride (PVC), an ethylene propylene diene monomer (EPDM), or any combination thereof; and
an adhesive formulation between the roof substrate and the roofing membrane,
wherein the adhesive formulation comprises:
a high viscosity silyl modified polymer having a viscosity of 20,000 cP or higher as measured according to ASTM D2196 using a Brookfield viscometer spindle number 6, at 20 rpm and 23° C.; and a moisture scavenger,
wherein a weight ratio of the moisture scavenger to the high viscosity silyl modified polymer is 1:20 to 1:2;

wherein, when aged for 28 days at 50° C., the adhesive formulation has a test viscosity, as measured using a Brookfield viscometer spindle number 6 at 20 rpm and at 23° C., that is within +40% of the initial viscosity.

13. The roofing system of claim 12, wherein the roofing membrane is a treated roofing membrane having at least one surface subjected to a plasma treatment process.

14. The roofing system of claim 13, wherein the treated roofing membrane comprises the thermoplastic polyolefin.

15. The roofing system of claim 13, wherein the treated roofing membrane comprises the polyvinyl chloride.

16. The roofing system of claim 13, wherein the treated roofing membrane comprises the ethylene propylene diene monomer.

17. The roofing system of claim 12, wherein the roofing membrane comprises the polyvinyl chloride; wherein the roofing membrane further comprises a liquid plasticizer.

18. The roofing system of claim 12, wherein the roofing membrane comprises the polyvinyl chloride; wherein the roofing membrane further comprises a ketone ethylene ester plasticizer.

19. The roofing system of claim 12, wherein the roofing membrane further comprises at least one of a cyclopiazonic acid, a chlorinated polyethylene resin, an ethylene interpolymer, a nitrile butadiene polymer, a polyisobutylene, an atactic polypropylene, a modified bitumen, a poly(styrene-butadiene-styrene), a styrene ethylene butylene styrene, an ethylene propylene diene monomer, a chlorosulfonated polyethylene rubber, a polychloroprene, a polycarbonate, a nylon, a polyvinyl acetate, a polystyrene, a polytetrafluoroethylene, a polyvinylidene fluoride, a polyurethane, an epoxy, or any combination thereof.

20. The roofing system of claim 12, wherein the roofing system has a wind uplift resistance of 100 to 250 pounds per square foot (psf) measured according to the 12×24 ft Wind Uplift Test at 23° C. and 50% relative humidity.

* * * * *